US010627910B2

United States Patent
Lu et al.

(10) Patent No.: US 10,627,910 B2
(45) Date of Patent: Apr. 21, 2020

(54) STROKE OPERATION PREDICTION FOR THREE-DIMENSIONAL DIGITAL CONTENT

(71) Applicant: Adobe Inc., San Jose, CA (US)

(72) Inventors: Jingwan Lu, Santa Clara, CA (US); Stephen J. DiVerdi, Oakland, CA (US); Byungmoon Kim, Sunnyvale, CA (US); Jun Xing, Nanjing (CN)

(73) Assignee: Adobe Inc., San Jose, CA (US)

( * ) Notice: Subject to any disclaimer, the term of this patent is extended or adjusted under 35 U.S.C. 154(b) by 53 days.

(21) Appl. No.: 15/438,276

(22) Filed: Feb. 21, 2017

(65) Prior Publication Data
US 2018/0239434 A1    Aug. 23, 2018

(51) Int. Cl.
| | | |
|---|---|---|
| *G06F 3/01* | (2006.01) | |
| *G06T 11/20* | (2006.01) | |
| *G06T 19/00* | (2011.01) | |
| *G06T 17/30* | (2006.01) | |
| *G06F 3/0346* | (2013.01) | |
| *G06F 3/0488* | (2013.01) | |
| *G06T 15/02* | (2011.01) | |

(52) U.S. Cl.
CPC .............. *G06F 3/017* (2013.01); *G06F 3/011* (2013.01); *G06F 3/0346* (2013.01); *G06F 3/0488* (2013.01); *G06T 11/203* (2013.01); *G06T 17/30* (2013.01); *G06T 19/00* (2013.01); *G06T 15/02* (2013.01)

(58) Field of Classification Search
CPC .......... G06F 3/017; G06F 3/011; G06T 17/30; G06T 11/203; G06T 19/00; G06T 15/02
See application file for complete search history.

(56) References Cited

U.S. PATENT DOCUMENTS

| | | | | |
|---|---|---|---|---|
| 7,750,911 | B2 * | 7/2010 | Bae ........................ | G06T 11/203 345/179 |
| 8,669,995 | B2 * | 3/2014 | Winnemoeller ... | G06K 9/00416 345/467 |
| 9,330,482 | B2 * | 5/2016 | Ishida ..................... | G06K 9/222 |
| 9,857,876 | B2 * | 1/2018 | Hare ........................ | G06F 3/017 |
| 10,019,440 | B2 * | 7/2018 | Joshi ..................... | G06T 11/203 |

(Continued)

OTHER PUBLICATIONS

HoloLens | HoloLensStudio Demo | Windows 10 | Microsoft HaloLens video (https://www.youtube.com/watch?v=qym11JnFQBM, Published on Jan. 21, 2015, (hereinafter Microsoft) (Year: 2015).*

(Continued)

*Primary Examiner* — Nitin Patel
*Assistant Examiner* — Amy Onyekaba
(74) *Attorney, Agent, or Firm* — SBMC

(57) ABSTRACT

Stroke operation prediction techniques and systems for three-dimensional digital content are described. In one example, stroke operation data is received that describes a stroke operation input via a user interface as part of the three-dimensional digital content. A cycle is generated that defines a closed path within the three-dimensional digital content based on the input stroke operation and at least one other stroke operation in the user interface. A surface is constructed based on the generated cycle. A predicted stroke operation is generated based at least in part on the constructed surface. The predicted stroke operation is then output in real time in the user interface as part of the three-dimensional digital content as the stroke operation data is received.

20 Claims, 12 Drawing Sheets

(56) References Cited

U.S. PATENT DOCUMENTS

| | | | |
|---|---|---|---|
| 2006/0082571 A1 | 4/2006 | McDaniel | |
| 2006/0132495 A1 | 6/2006 | Anderson | |
| 2009/0195536 A1 | 8/2009 | Louise et al. | |
| 2009/0284550 A1 | 11/2009 | Shimada et al. | |
| 2010/0194694 A1* | 8/2010 | Kraft | G06F 3/04883 345/173 |
| 2010/0199226 A1* | 8/2010 | Nurmi | G06F 3/0237 715/863 |
| 2011/0071818 A1* | 3/2011 | Jiang | G06F 3/0236 704/8 |
| 2012/0038735 A1* | 2/2012 | Hasegawa | B41J 2/4753 347/217 |
| 2012/0144283 A1* | 6/2012 | Hill | G06F 17/242 715/211 |
| 2013/0016914 A1* | 1/2013 | Kennard | G06K 9/00161 382/215 |
| 2013/0127836 A1* | 5/2013 | Joshi | G06T 11/203 345/419 |
| 2014/0341463 A1 | 11/2014 | Ramalingam et al. | |
| 2015/0169975 A1* | 6/2015 | Kienzle | G06K 9/34 382/189 |
| 2015/0371417 A1* | 12/2015 | Angelov | G06Q 10/101 345/442 |
| 2016/0253090 A1* | 9/2016 | Angelov | G06Q 10/101 715/863 |
| 2017/0017323 A1* | 1/2017 | Yu | G02B 27/0172 |
| 2017/0018116 A1 | 1/2017 | Sun et al. | |
| 2017/0083276 A1* | 3/2017 | Lee | G06F 3/1454 |
| 2017/0289219 A1* | 10/2017 | Khalid | H04L 65/4084 |
| 2018/0075658 A1* | 3/2018 | Lanier | G06T 19/006 |
| 2018/0300912 A1 | 10/2018 | Krs et al. | |

OTHER PUBLICATIONS

"Combined Search and Examination Report", GB Application No. 1720867.9, dated May 24, 2018, 6 pages.

"Final Office Action", U.S. Appl. No. 15/485,980, dated Apr. 16, 2019, 21 pages.

"First Action Interview Office Action", U.S. Appl. No. 15/485,980, dated Nov. 13, 2018, 8 pages.

"Pre-Interview First Office Action", U.S. Appl. No. 15/485,980, dated Oct. 16, 2018, 8 pages.

Masry,"A Sketch-based Interface for Iterative Design and Analysis of 3D Objects", Aug. 2007, 10 pages.

Nealen,"A Sketch-Based Interface for Detail-Preserving Mesh Editing", ACM Transactions on Graphics, vol. 24, No. 3, Aug. 2007, 6 pages.

"Foreign Office Action", GB Application No. 1720867.9, dated Jun. 21, 2019, 3 pages.

"Advisory Action", U.S. Appl. No. 15/485,980, dated Aug. 23, 2019, 3 pages.

"Notice of Allowance", U.S. Appl. No. 15/485,980, dated Jan. 9, 2020, 16 pages.

\* cited by examiner

STROKE OPERATION PREDICTION FOR
THREE-DIMENSIONAL DIGITAL CONTENT

BACKGROUND

Techniques have been developed to expand a richness in display and interaction with digital content. Examples of this include virtual reality and augmented reality. In augmented reality, three-dimensional digital content is created by a computing device to augment a user's direct view of a physical environment in which the user is disposed. In other words, this direct view of the physical environment is not recreated as part of an augmented reality environment but rather the user actually "sees what is there." The three-dimensional digital content is thus used to augment the user's view of this physical environment, such as to play a building game of virtual blocks on a physical table top. On the other hand, in virtual reality the computing device generates three-dimensional digital content to recreate a user's environment such that the physical environment is not viewable by the user. Accordingly, in virtual reality an entirety of the user's view of created virtually as part of the environment by the computing device.

Although three-dimensional digital content in both virtual and augmented reality have expanded a richness of user interaction, immersive user manipulation within these environments to create three-dimensional digital content remains a challenge. For example, the drawing of three-dimensional digital content that includes detailed structures and shapes is challenging due to the lack of tactile feedback and precise control supported by conventional AR and VR environments. Accordingly, content creators are typically forced to operate outside of these environments to create content that is then configured to be consumed in these environments, such as through use of a mouse, keyboard, and stylus of conventional desktop computers.

SUMMARY

Stroke operation prediction techniques and systems for three-dimensional digital content are described. In the techniques described herein, a 3D drawing module of a computing device predicts a subsequent stroke operation and even surface of 3D digital content being created based on other stroke operations within the content. The 3D drawing module does so by generating a cycle that includes a stroke operation input and other existing stroke operations already input as part of the 3D digital content. The cycle is generated based on a variety of constraints, examples of which include distance between stroke operations (e.g., temporal and/or spatial), direction (e.g., consistency of turn directions between stroke operations), amount of an input stroke operation that is used to define the cycle, and so forth. The cycle is then used to generate a surface that is used as a basis to generate a predicted stroke operation, which is output in a user interface as selectable for inclusion as part of the 3D digital content being created.

In this way, efficiency of a user in interacting with a user interface to create 3D digital content is increased by the 3D drawing module. Additionally, the techniques described herein as implemented by the 3D drawing module provide numerous technical advantages, including an increase in efficient use of computational resources of a computing device to predict stroke operations that supports real time output, which is not possible using conventional techniques.

This Summary introduces a selection of concepts in a simplified form that are further described below in the Detailed Description. As such, this Summary is not intended to identify essential features of the claimed subject matter, nor is it intended to be used as an aid in determining the scope of the claimed subject matter.

BRIEF DESCRIPTION OF THE DRAWINGS

The detailed description is described with reference to the accompanying figures. Entities represented in the figures may be indicative of one or more entities and thus reference may be made interchangeably to single or plural forms of the entities in the discussion.

DETAILED DESCRIPTION

Overview

Figure 1:
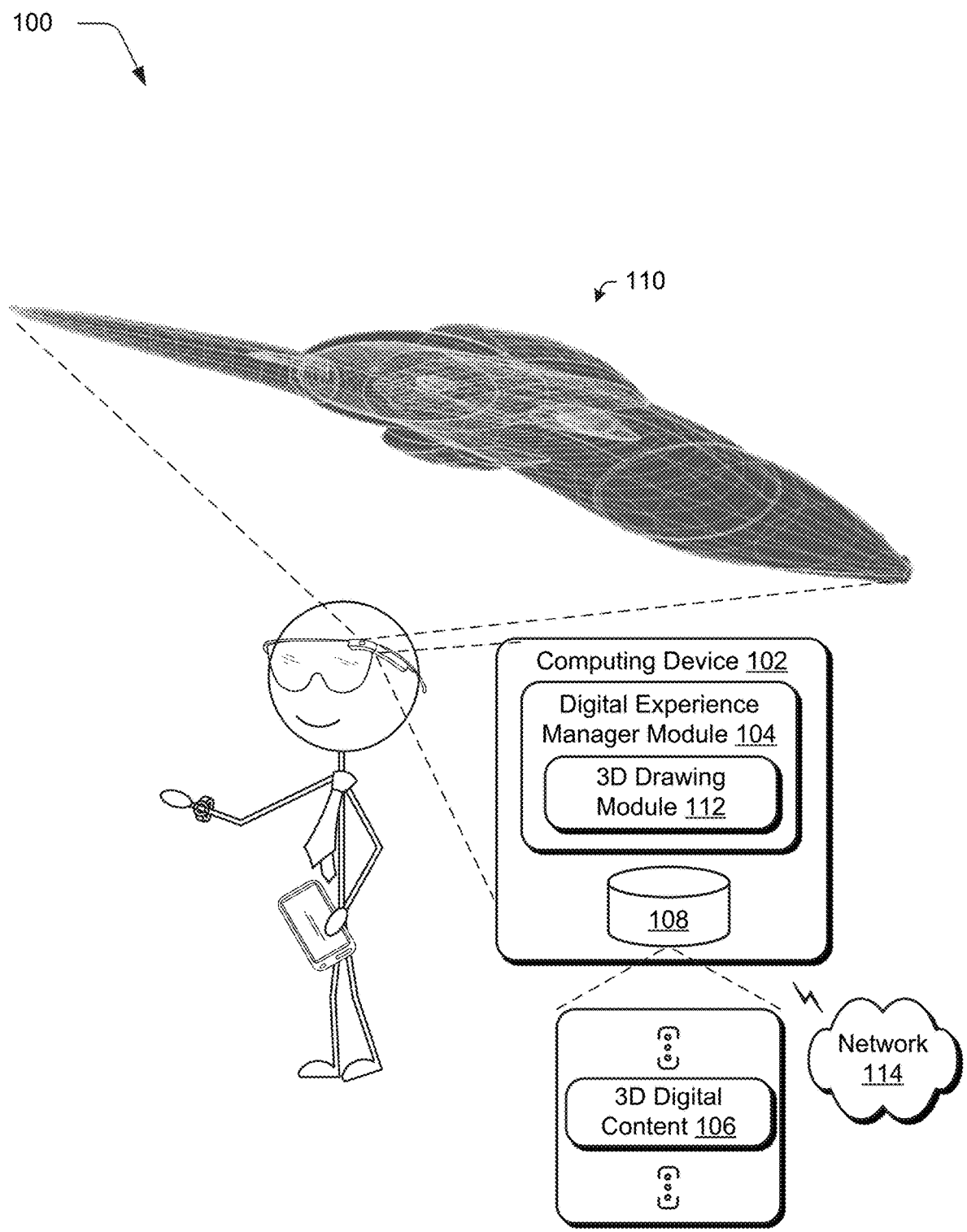
FIG. 1 is an illustration of an environment in an example implementation that is operable to employ stroke operation prediction techniques for three-dimensional digital content as described herein.

Creation of three-dimensional (3D) digital content has emerged as a new art form due to the increased availability of computing devices that are capable of supporting output of augmented and virtual reality environments. One example of this is 3D painting, which combines the expressiveness of paints and brushes through stroke operations with the physicality and presence of sculpture and architecture. However, conventional painting and other techniques used to create 3D digital content through interaction with a computing device are often considered tedious due to the sheer number of stroke operations that are involved in drawing and filling surfaces of shapes.

Additionally, conventional painting techniques employed by the computing device are also often considered challenging due to a lack of precision felt by a user as part of providing the inputs to the computing device. A user, for instance, that "draws in the air" in a natural user interface of the computing device is provided with limited feedback in comparison to a physical pen and paper, a physical material used to sculpt an object, and so forth. As a result, the user may find it difficult to input repeatable stroke operations, align stroke operations with other stroke operations, and so forth. Thus, there is a need for techniques and systems that enable creative users to realize a full range of creative expression and increase accuracy and efficiency as part of 3D digital content creation.

Stroke operation prediction techniques and systems for three-dimensional content are described. In the techniques described herein, stroke operation prediction is used by a 3D drawing module to support interactive modelling to predict a subsequent stroke operation and even surface of 3D digital content being created based on other stroke operations within the content. In this way, efficiency of a user in interacting with a user interface to create 3D digital content is increased by the 3D drawing module. Additionally, the techniques described herein as implemented by the 3D drawing module provide numerous technical advantages, including an increase in efficient use of computational resources of a computing device to predict stroke operations that supports real time output of the predicted stroke operation (e.g., in which input data is processed within milliseconds so that it is available virtually immediately as feedback), which is not possible using conventional techniques.

To do so in one example, the 3D drawing module of a computing device analyzes a structure exhibited by existing stroke operations in a neighborhood of an input stroke operation (i.e., a stroke operation being drawn) and from this defines a surface that is to be used as a basis to predict a subsequent stroke operation, i.e., the predicted stroke operation. The surface is determined by the 3D drawing module by generating a cycle (e.g., a closed loop) that includes the input stroke operation and another stroke operation (existing or constructed as further described below) in the content, e.g., using a tree search technique.

As part of generating the cycle, the 3D drawing module may take into account a variety of constraints, i.e., rules. A first example of a constraint used by the 3D drawing module includes ensuring that the input stroke operation and existing stroke operations are within a defined distance of each other and thus have an increased likelihood of defining a single plane. Another example constraint is used to ensure consistency of directionality (e.g., turn direction) of the input stroke operation and existing stroke operations, e.g., directions defined using surface normals at intersections of respective stroke operations. In a further example, the 3D drawing module employs a constraint that excludes existing stroke operations in the user interface from consideration that loop back to a starting point at which the existing stroke operations intersect the input stroke operation, i.e., are self-intersecting at a single point with the input stroke operation. In yet another example, a constraint is used to define a minimum amount of the input stroke operation to be used as part of the generated cycle, such as to ensure that a sufficiently representative portion of the input stroke operation is used. In this way, the 3D drawing module may efficiency and accurately define a cycle (e.g., closed path) in real time within the user interface that is used to define a surface of an object being drawn in the user interface, which is not possible using conventional techniques.

In an implementation, the 3D drawing module is configured to construct a stroke operation or stroke operations to define the cycle automatically and without user intervention. This may be performed by the 3D drawing module in response to a determination that existing stroke operations, if any, within the 3D digital content being created are not sufficient to define the cycle subject to the above constraints. The user, for instance, may define first and second sides of a rectangle. These two sides, alone, are not sufficient to define a cycle. Accordingly, the 3D drawing module may construct the third and fourth sides of the rectangle by creating third and fourth stroke operations to generate the cycle (e.g., the rectangle) based at least in part on the above constraints and from this define the surface automatically and without further user intervention. The constructed stroke operations may or may not be output by the 3D drawing module in a user interface for viewing by a user.

The surface, once defined by the 3D drawing module, is then used as a basis to generate a predicted stroke operation. In one example, a 3D predicted stroke operation is generated along a normal direction (e.g., perpendicular) in relation to the surface described above. This is done by first projecting the input stroke operation from three dimensions to two dimensions based on the surface generated above. A result of the projection is a 2D input stroke operation and an offset in relation to the surface, i.e., a distance from the surface. The 2D input stroke operation is then used as a basis, along with other stroke operations in the user interface that exist or have been constructed by the module, to generate the stroke operation prediction by a stroke operation predication module of the 3D drawing module. A variety of techniques may be used to generate this prediction by the stroke operation prediction module. Examples of prediction generation techniques include detection of existing patterns and repetition such that the predicted stroke operation may mimic or complement (e.g., mirror) existing stroke operations in the user interface. The 2D stroke operation prediction is then projected from two dimensions to three dimensions based on the offset from the surface to define a predicted stroke operation in three dimensions for output in the user interface in relation to the 3D digital content.

Through the techniques and systems described herein, predicted stroke operations may be generated in real time as an input is received that defines samples of the input stroke operation. A stroke operation, for instance, may be defined as a continuous user gesture that defines a continuous line in three dimensions in the user interface. Accordingly, the 3D drawing module may generate samples from the stroke operation as it is received by the module and apply the techniques described above to the samples in real time, which is not possible using conventional techniques that require a completed network of stroke operations to define surfaces.

The predicted stroke operations may be output in a variety of ways. The 3D drawing module, for instance, may display a single predicted stroke operation that is user selectable within a set amount of time (e.g., a few seconds) to cause the predicted stroke operation to be included as part of the 3D digital content, or part of multiple stroke operations defining the surface as a whole which is also selectable to "fill in" the rest of the surface, e.g., as a lattice that completes the surface. If the predicted stroke operation is not selected within the set amount of time, appearance of the predicted stroke operation may fade from the user interface as caused by the 3D drawing module. In this way, the 3D drawing module may be employed by a user to first draw high-level structures that are "autocompleted" by the 3D drawing module through use of predicted stroke operations that are not manually input by the user. The user may then continue to specify low-level details, such as to depict fur or leaves through use of a couple of input stroke operations that are then used by the 3D drawing module to automatically fill an entire surface of the 3D digital content in a similar manner. Further description of these and other examples is included in the following sections and shown in corresponding figures.

In the following discussion, an example environment is described that may employ the techniques described herein. Example procedures are also described which may be performed in the example environment as well as other environments. Consequently, performance of the example procedures is not limited to the example environment and the example environment is not limited to performance of the example procedures.

Example Environment

FIG. 1 depicts an example digital medium environment 100 configured to support stroke operation prediction techniques for three-dimensional digital content. The digital medium environment 100 as illustrated in this example includes a computing device 102. The computing device 102 may be implemented using a variety of different types of computing devices in a variety of configurations.

A computing device, for instance, may be configured as a desktop computer, a laptop computer, a mobile device (e.g., assuming a handheld configuration such as a tablet or mobile phone), worn by a user as goggles or other eyewear, and so forth. Thus, a computing device may range from full resource devices with substantial memory and processor resources (e.g., personal computers, game consoles) to a low-resource device with limited memory and/or processing resources (e.g., mobile devices). Additionally, although a single computing device is shown by way of example, the computing device may be representative of a plurality of different devices, such as multiple servers to perform operations "over the cloud" as described in FIG. 12.

The computing device 102 is further illustrated as including a digital experience manager module 104. The digital experience manager module 104 is implemented at least partially in hardware of the computing device 102 (e.g., a processing system and computer-readable storage medium) to manage generation, storage, and provision of 3D digital content 106, which is illustrated as stored in storage 108, e.g., a computer-readable storage media, database system, and other tangible examples. The computing device 102, for instance, may receive the 3D digital content 106 and render it for viewing by a user, a rendered example 110 of which is illustrated as a street scene of a city. A user of the computing device 102 may then interact with the rendered example 110, e.g., to view, listen to, navigate between, and even manipulate virtual objects.

An example of functionality usable to interact and create the 3D digital content 106 is illustrated as a 3D drawing module 112. The 3D drawing module 112 is implemented at least partially in hardware of the computing device 102 to create, transform, and/or render the 3D digital content 106. Although functionality of the 3D drawing module 112 is illustrated as local to the computing device 102, this functionality may also be implemented in whole or in part using other computing devices, such as "in the cloud" as further described in relation to FIG. 12.

One example of functionality usable to interact and create the 3D digital content 106 is 3D painting, which combines the expressiveness of paints and brushes through stroke operations with the physicality and presence of sculpture and architecture. As previously described, conventional painting and other techniques used to create 3D digital content through interaction with a computing device are often considered tedious due to the sheer number of stroke operations that are involved in drawing and filling surfaces of shapes. For example, conventional techniques required a user to manually specify each of the illustrated stroke operations in the rendered example 110 to form surfaces and manually "fill in" each of the surfaces. As such, conventional techniques are both inefficient with regards to user inputs as well as consumption of computational resources involved in the detection of user inputs and rendering of each of these individual stroke operations.

Accordingly, the 3D drawing module 112 is configured to predict stroke operations that may be desired for inclusion as part of the 3D digital content 106 as part of 3D painting based on existing stroke operations already included as part of the 3D digital content and even stroke operations constructed by the 3D drawing module, itself, as further described below. The 3D drawing module 112, for instance, may monitor and analyze stroke operations input by the user in the past in order to predict stroke operations that may be desired by the user for inclusion as part of the 3D digital content 106. The predicted stroke operations may then be output by the 3D drawing module 112 as hints that are selectable for inclusion as part of the 3D digital content 106 or may be ignored and in response automatically removed by the 3D drawing module 112 from display in a user interface. Further, the 3D drawing module 112 may generate and output the predicted stroke operations in real time as inputs are received from the user in real time, which is not possible in conventional techniques and systems. User interaction with the 3D drawing module 112 may be implemented in a variety of ways, such as a touchscreen computer, mobile device, desktop PC, or even in an augmented or virtual reality environment, an example of which is described as follows and shown in a corresponding figure.

Figure 2:
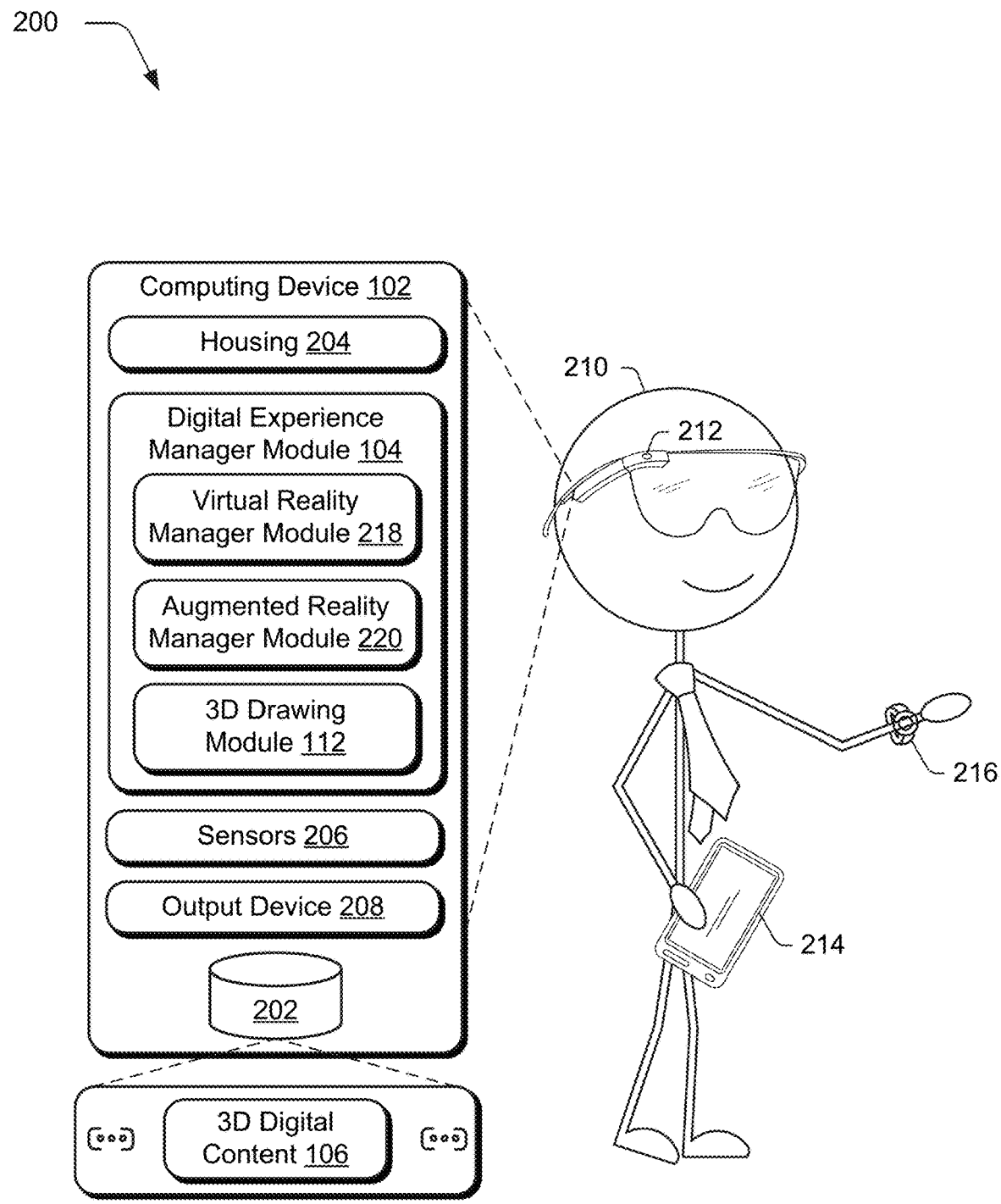
FIG. 2 is an illustration of a digital medium environment in an example implementation showing a computing device of FIG. 1 in greater detail as configured for rendering of a virtual or augmented reality environment.

FIG. 2 is an illustration of a digital medium environment 200 in an example implementation showing the computing device 102 of FIG. 1 in greater detail. The illustrated environment 100 includes the computing device 102 of FIG. 1 as configured for use in augmented reality and/or virtual reality scenarios, which may be configured in a variety of ways.

The computing device 102 is illustrated as including the digital experience manager module 104 of FIG. 1. The digital experience manager module 104 is configured to manage creation, rendering, and user interaction with 3D digital content 106. The 3D digital content 106 is illustrated as maintained in storage 202 of the computing device 102, e.g., a database, computer-readable storage media, and so forth.

The computing device 102 includes a housing 204, one or more sensors 206, and an output device 208, e.g., display device, speakers, tactile output, and so forth. The housing 204 is configurable in a variety of ways to support user interaction as part of the 3D digital content 106, i.e., an augmented or virtual reality environment defined by the content. In one example, the housing 204 is configured to be worn on the head of a user 210 (i.e., is "head mounted" 212), such as through configuration as goggles, glasses, contact lens, and so forth. In another example, the housing 204 assumes a hand-held 214 form factor, such as a mobile phone, tablet, portable gaming device, and so on. In yet another example, the housing 204 assumes a wearable 216 form factor that is configured to be worn by a user 210, such as a watch, broach, pendant, or ring. Other configurations are also contemplated, such as configurations in which the computing device 102 is disposed in a physical environment apart from the user 210, e.g., as a "smart mirror," wall-mounted projector, television, and so on.

The sensors 206 may also be configured in a variety of ways to detect a variety of different conditions. In one example, the sensors 206 are configured to detect an orientation of the computing device 102 in three-dimensional space, such as through use of accelerometers, magnetometers, inertial devices, radar devices, and so forth. In another example, the sensors 206 are configured to detect environmental conditions of a physical environment in which the computing device 102 is disposed, such as objects, distances to the objects, motion, colors, and so forth. A variety of sensor configurations may be used, such as cameras, radar devices, light detection sensors (e.g., IR and UV sensors), time of flight cameras, structured light grid arrays, barometric pressure, altimeters, temperature gauges, compasses, geographic positioning systems (e.g., GPS), and so forth. In a further example, the sensors 206 are configured to detect environmental conditions involving the user 210, e.g., heart rate, temperature, movement, and other biometrics.

The sensors 206 may also detect inputs in non-AR/VR scenarios. For example, any 3D drawing scenario may be supported, which may include a two-handed gestural input on a desktop computer monitor (e.g., with stereo glasses), a 6D pen input type device, tablet and stylus input, and so forth.

The output device 208 is also configurable in a variety of ways to support a virtual or augmented reality environment through visual, audio, and even tactile outputs. Examples of which include a typical display device found on a mobile device such as a camera or tablet computer, a light field display for use on a head mounted display in which a user may see through portions of the display, stereoscopic displays, projectors, television (e.g., a series of curved screens arranged in a semicircular fashion), and so forth. Other configurations of the output device 208 may also be included as part of the computing device 102, including devices configured to provide user feedback such as haptic responses, audio sounds, and so forth.

The housing 204, sensors 206, and output device 208 are also configurable to support different types of user experiences by the experience interaction module 116. In one example, a virtual reality manager module 218 is employed to support virtual reality. In virtual reality, a user is exposed to an immersive environment, the viewable portions of which are entirely generated by the computing device 102. In other words, everything that is seen and heard by the user 210 is rendered and displayed by the output device 208 (e.g., visual and sound) through use of the virtual reality manager module 218 by rendering the 3D digital content 106.

The user 210, for instance, may create 3D digital content 106 that are not "really there" (e.g., virtual bricks) and are displayed for viewing by the user in an environment that also is completely computer generated. The computer-generated environment may also include representations of physical objects included in a physical environment of the user 210, e.g., a virtual table that is rendered for viewing by the user 210 to mimic an actual physical table in the environment detected using the sensors 206. On this virtual table, the virtual reality manager module 218 may also dispose 3D digital content 106 that are not physically located in the physical environment of the user 210, e.g., the virtual bricks as part of a virtual playset. In this way, although an entirely of the display being presented to the user 210 is computer generated, the virtual reality manager module 218 may represent physical objects as well as virtual objects within the display.

The digital experience manager module 104 is also illustrated as supporting an augmented reality manager module 220. In augmented reality, the 3D digital content 106 is used to augment a direct view of a physical environment of the user 210. The augmented reality manger module 220, for instance, may detect landmarks of the physical table disposed in the physical environment of the computing device 102 through use of the sensors 206, e.g., object recognition. Based on these landmarks, the augmented reality manager module 220 configures 3D digital content 106 to be viewed within this environment.

The user 210, for instance, may view the actual physical environment through head-mounted 212 goggles. The head-mounted 212 goggles do not recreate portions of the physical environment as virtual representations as in the VR scenario above, but rather permit the user 210 to directly view the physical environment without recreating the environment. The 3D digital content 106 is then displayed by the output device 208 to appear as disposed within this physical environment. Thus, in augmented reality the 3D digital content 106 augments what is "actually seen and heard" by the user 210 in the physical environment. In the following discussion, the 3D digital content 106 may be rendered by the digital experience manager module 104 in both a virtual reality scenario and an augmented reality scenario.

In general, functionality, features, and concepts described in relation to the examples above and below may be employed in the context of the example procedures described in this section. Further, functionality, features, and concepts described in relation to different figures and examples in this document may be interchanged among one another and are not limited to implementation in the context of a particular figure or procedure. Moreover, blocks associated with different representative procedures and corresponding figures herein may be applied together and/or combined in different ways. Thus, individual functionality, features, and concepts described in relation to different example environments, devices, components, figures, and procedures herein may be used in any suitable combinations and are not limited to the particular combinations represented by the enumerated examples in this description.

Cycle Generation and Surface Construction

Figure 3:
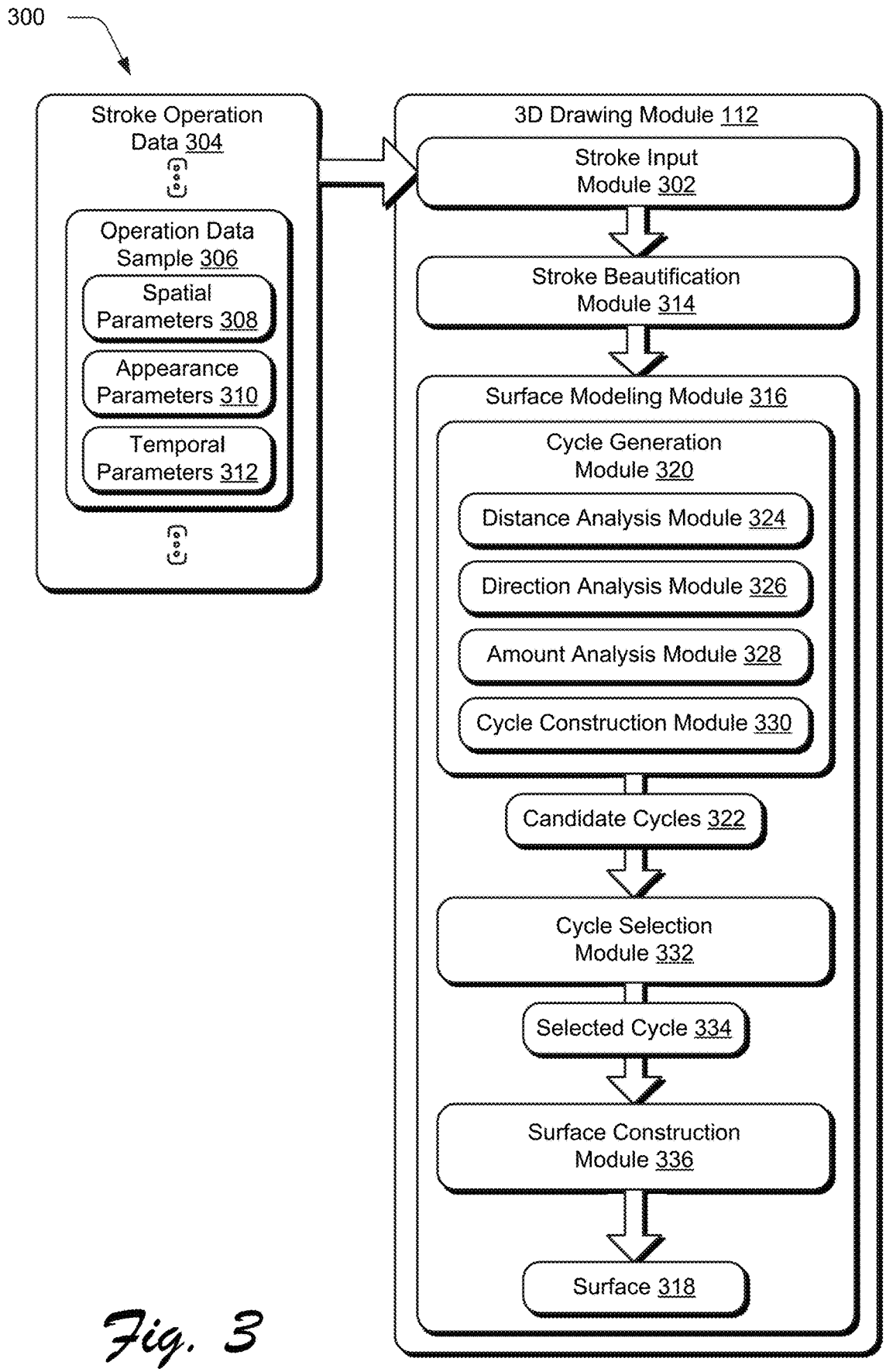
FIG. 3 depicts a system in an example implementation showing operation of a 3D drawing module in greater detail as generating a cycle that is used as a basis to construct a surface.
Figure 4A:
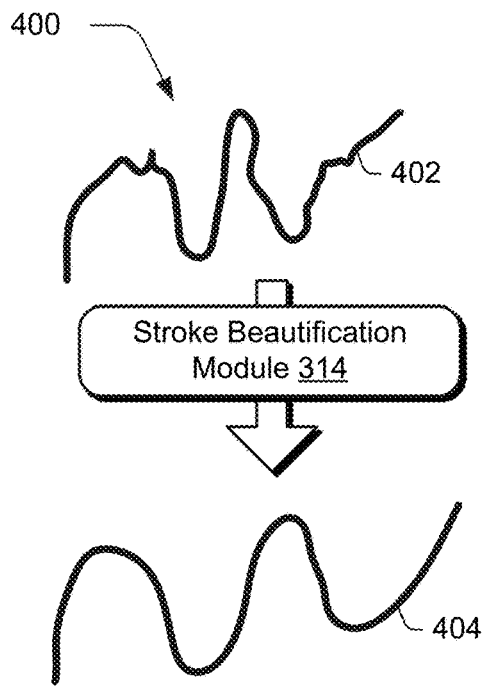
FIGS. 4A-4D depicts examples of stroke operation beautification as performed by a 3D drawing module of FIG. 3.
Figure 4B:
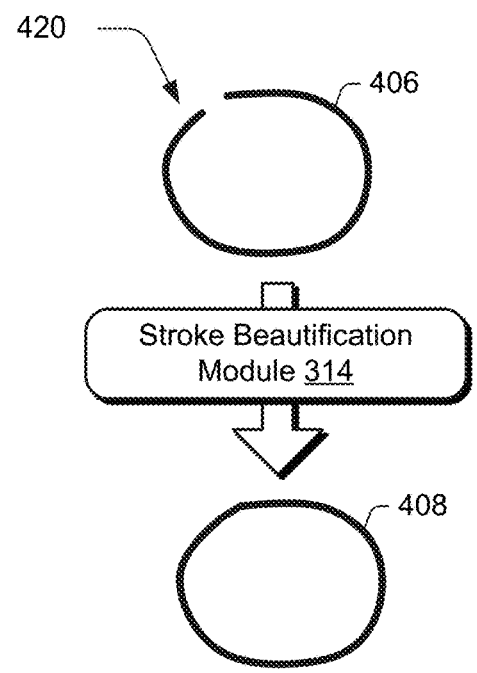
Figure 5A:
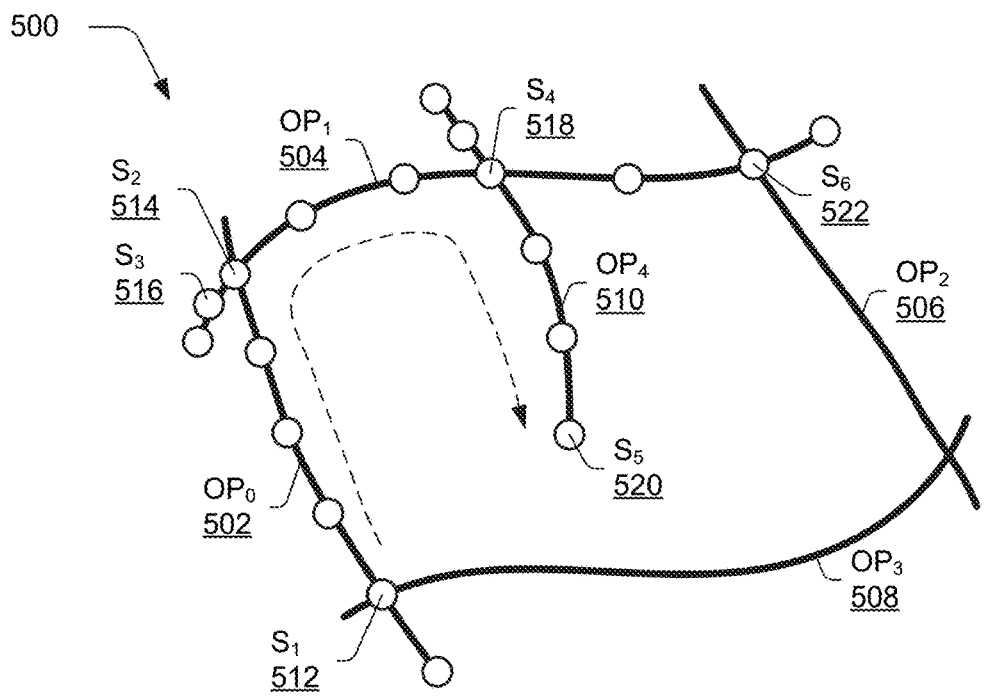
FIGS. 5A and 5B depict example implementations of paths used as a basis to generate a cycle by the 3D drawing module of FIG. 3.
Figure 5B:
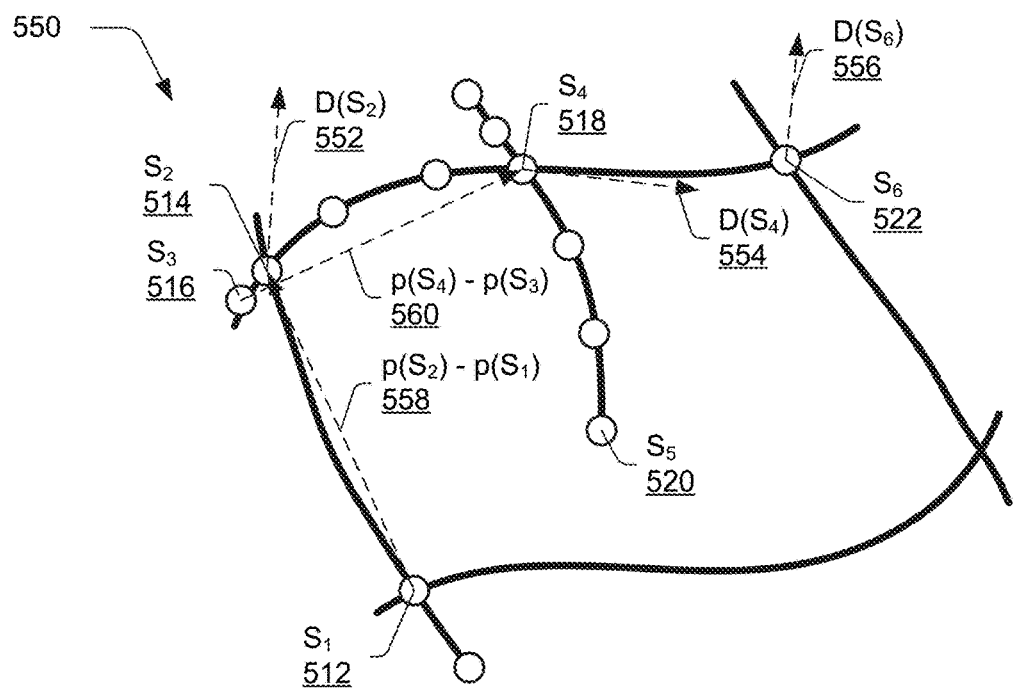
Figure 6A:
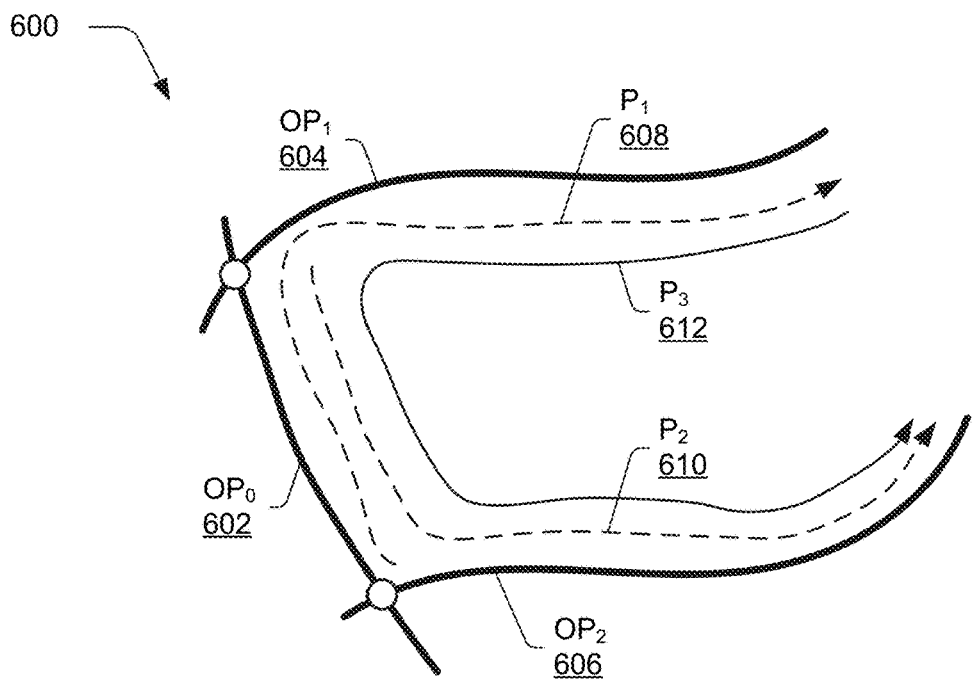
FIGS. 6A and 6B depict examples implementations of path construction as performed by the 3D drawing module of FIG. 3 in order to generate a cycle.
Figure 6B:
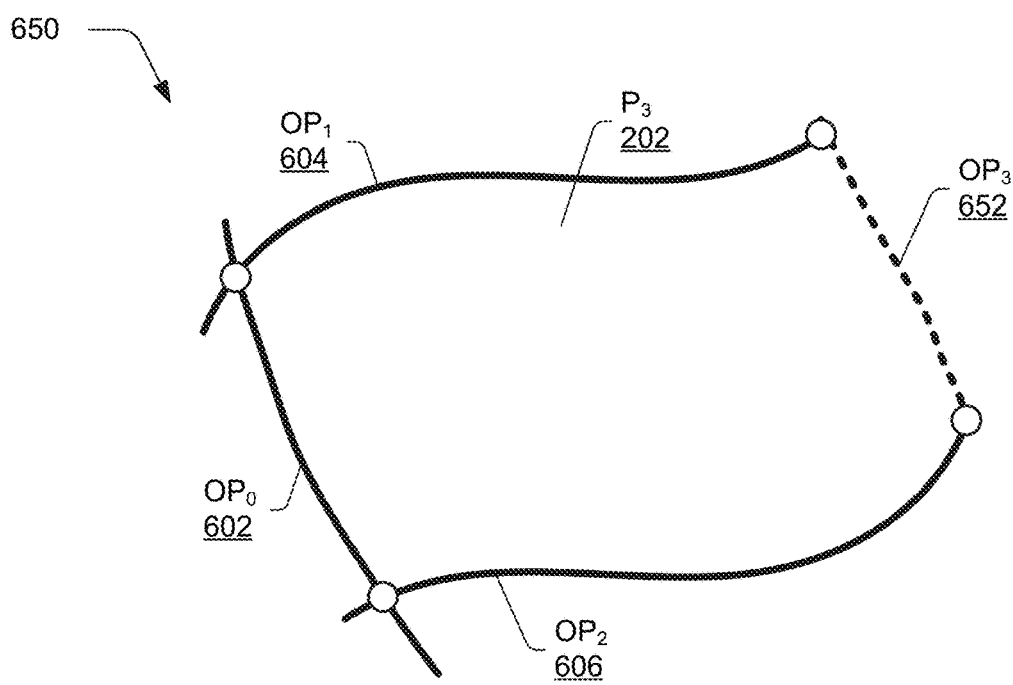
Figure 7A:
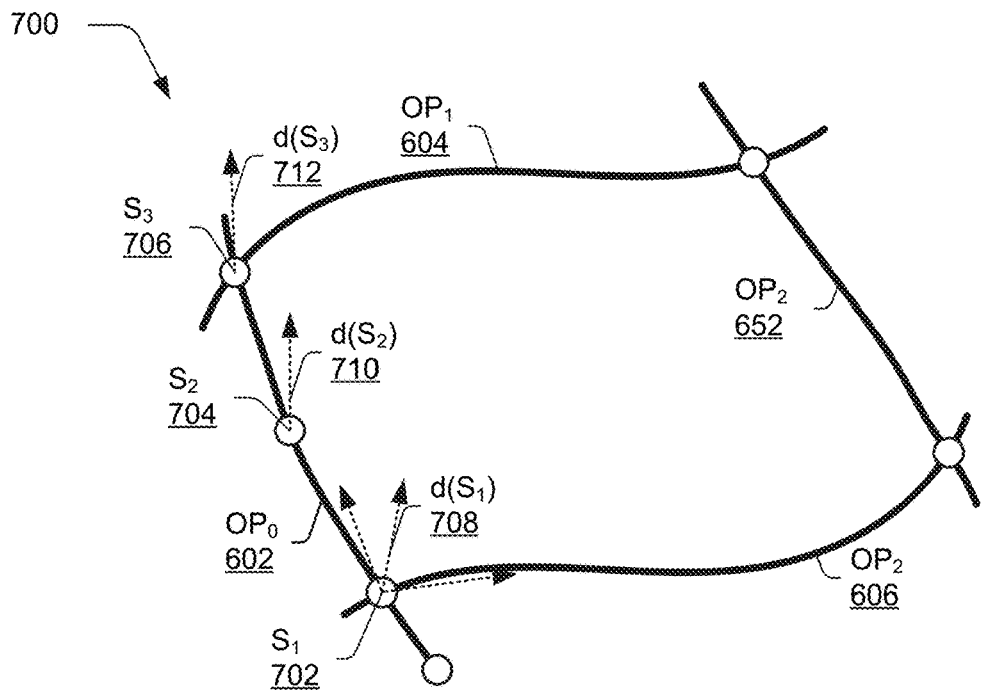
FIGS. 7A and 7B depict example implementations of cycle selection as performed by the 3D drawing module of FIG. 3 that is used to generate a cycle.
Figure 7B:
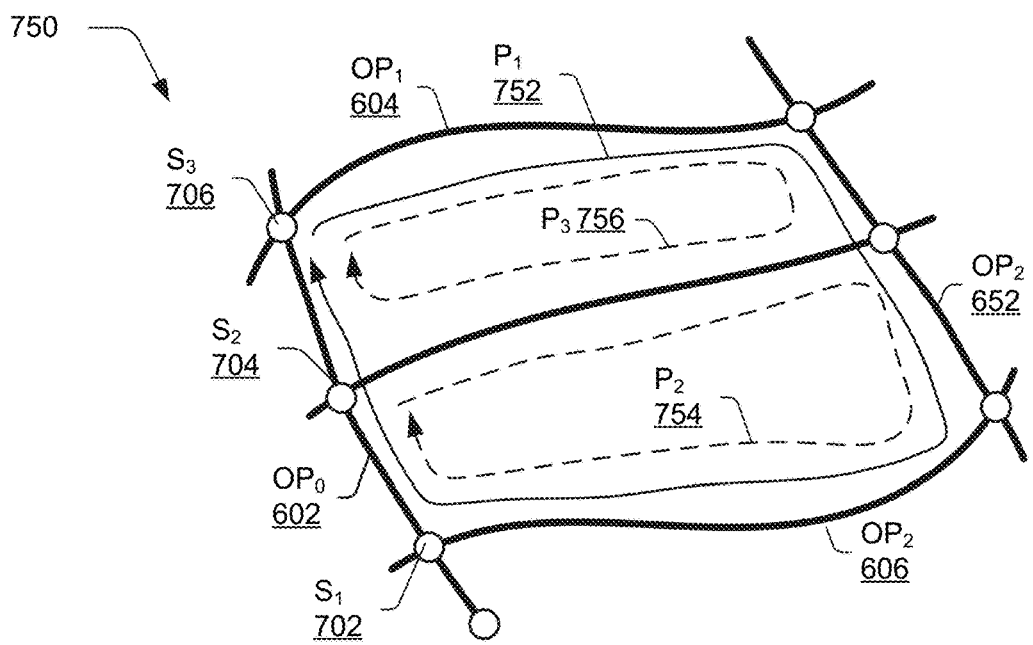
Figure 8:
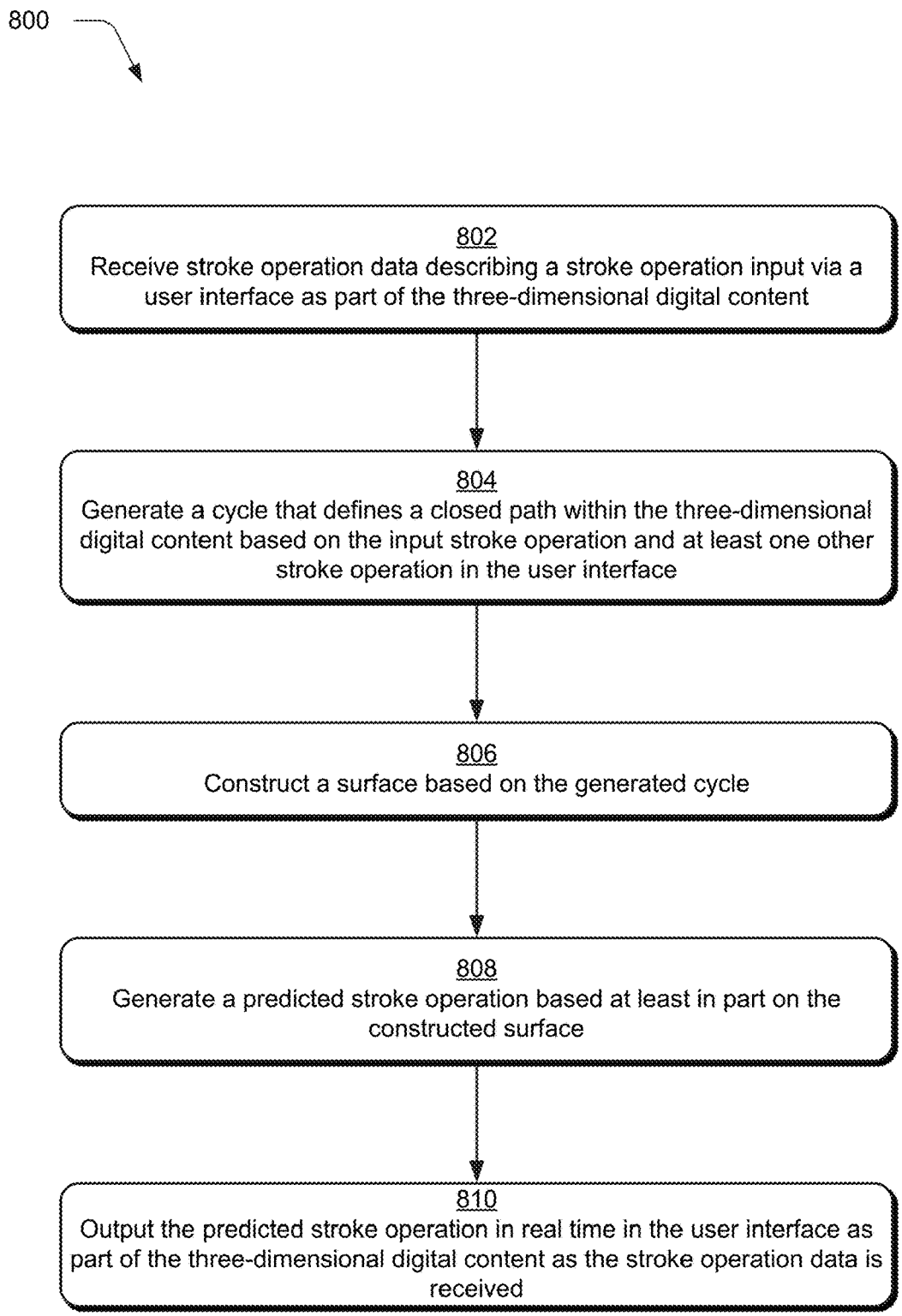
FIG. 8 is a flow diagram depicting a procedure in an example implementation in which a stroke operation prediction is generated based on a surface constructed from the generated cycle of the system of FIG. 4.

FIG. 3 depicts a system 300 in an example implementation showing operation of the 3D drawing module 112 in greater detail as generating a cycle that is used as a basis to construct a surface. The surface is then used by the 3D drawing module as a basis to generate a predicted stroke. FIGS. 4A-4B depict example implementations 400, 420, 440, 460 of stroke beautification as performed by the 3D drawing module 112. FIGS. 5A and 5B depict example implementations 500, 550 of paths used as a basis to generate a cycle by the 3D drawing module 112. FIGS. 6A and 6B depict examples 600, 650 of path construction as performed by the 3D drawing module 112 in order to generate a cycle. FIGS. 7A and 7B depict example implementations 700, 750 of cycle selection as performed by the 3D drawing module 112 that is used to generate a cycle. FIG. 8 depicts a procedure 800 in an example implementation in which a stroke prediction is generated based on a surface constructed from the generated cycle of the system 300 of FIG. 4.

The following discussion describes techniques that may be implemented utilizing the described systems and devices. Aspects of the procedure may be implemented in hardware, firmware, or software, or a combination thereof. The procedure is shown as a set of blocks that specify operations performed by one or more devices and are not necessarily limited to the orders shown for performing the operations by the respective blocks. In portions of the following discussion, reference is made interchangeably to FIGS. 3-8.

To begin, the 3D drawing module 112 employs a stroke input module 302 to receive stroke operation data 304 that describes an input stroke operation via a user interface as part of the three-dimensional digital content (block 802). Each input stroke operation defined by the stroke operation data 304 involves a continuous user gesture that is used to define a shape and length of the stroke to be drawn as part of 3D digital content 106. The user 210, for instance, may interact with a natural user interface as part of a virtual or augmented reality environment and make a gesture using a hand that is detected by sensors 206 to form the stroke operation data 304. Other examples are also contemplated, such as through use of touchscreen functionality, cursor control device, and so on.

The stroke input module 302 is configured to sample each stroke operation "op" defined by the stroke operation data 304 (e.g., uniformly) to form a plurality of operation data samples 306, "s ∈ op." Each of the operation data samples "s" 306 includes spatial parameters "p(s)" that record a position and pose at "s," appearance parameters "a(s)" 310 (e.g., color, texture, size), and temporal parameters "t(s)" that include a global time stamp and a sample identifier for a relative position within the stroke operation "op." The stroke input module 302 may normalize the sample identifier to have a value between [0, 1], where 0 and 1 represent a starting and ending position of the stroke operation "op," respectively, to define an order of the samples in relation to each other. Thus, each stroke operation "op" defined in the stroke operation data 304 may be defined as a collection of operation data samples 306 "{s}" and represented as follows:

$$u(s)=(p(s),a(s),t(s))$$

The operation data samples 306 of the stroke operation data 304 are then provided by the stroke input module 302 to the stroke beautification module 314. The stroke beautification module 314 is configured to transform the operation data samples 306 of the stroke operation data 304 in order to increase a likelihood that the stroke is visually pleasing to a user when rendered in a user interface by the 3D drawing module 112.

As shown in the example implementation 400 of FIG. 4A, for instance, a stroke input 402 is beautified by the stroke beautification module 314 by a smoothing technique (e.g., a B-spline technique) to form a smoothed stroke input 404. In the example implementation 420 of FIG. 4B, a stroke input 406 is beautified by the stroke beautification module 314 by a closure technique to form a closed stroke input 408. This is performed by the stroke beautification module 314 in response to detecting that end points of the stroke are within a threshold distance of each other as defined in relation to a total length of the stroke input 406.

Figure 4C:
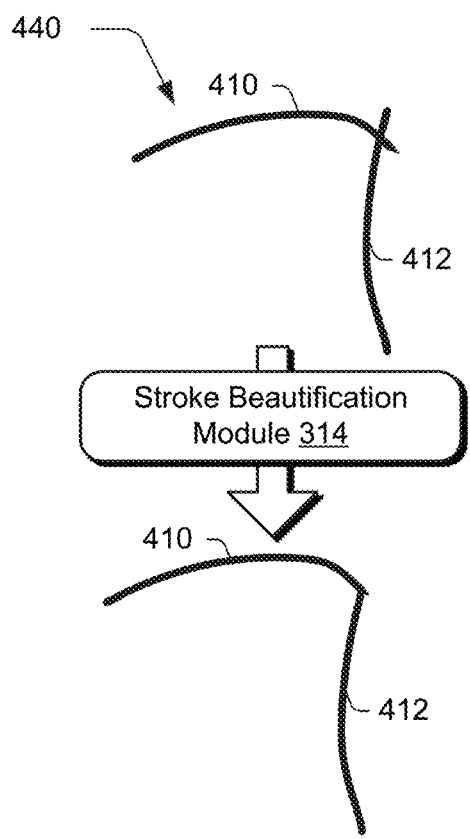

In the example implementation 440 of FIG. 4C, a plurality of stroke inputs 410, 412 are beautified by the stroke beautification module 314. This is performed by connecting the ends of the stroke inputs 410, 412 together when the stroke beautification module 314 detects that end points of the stroke inputs 410, 412 are within a threshold distance of each other as defined in relation to a total length of the stroke inputs 410, 412.

Figure 4D:
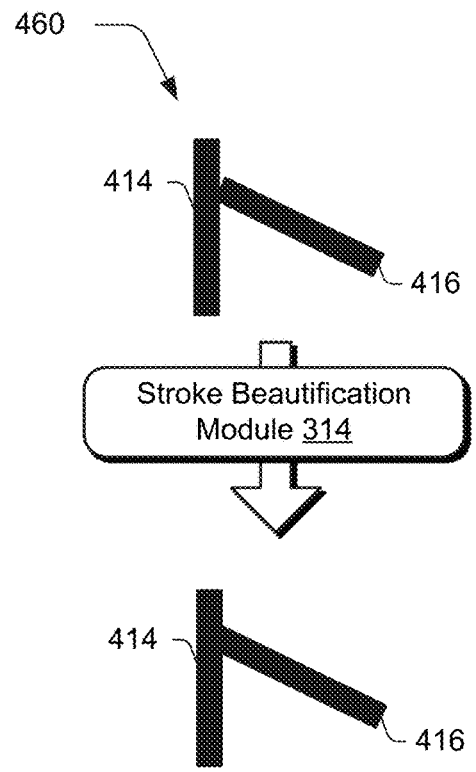

In the example implementation 460 of FIG. 4D, a plurality of stroke inputs 414, 416 are beautified by the stroke beautification module 314 by aligning an end of the stroke inputs 416 at an intersection point along a length of stroke input 414. The stroke beautification module 314, for instance, may detect that an end point of the stroke input 416 is within a threshold distance of at least part of the stroke input 414. Thus, the stroke beautification module 314 may employ a variety of techniques to beautify a stroke input, other examples of which are also contemplated without departing from the spirit and scope of the present discussion.

Returning again to FIG. 3, the stroke operation data 304, whether beautified or not, is then provided to a surface modeling module 316. The surface modeling module 316 is implemented at least partially in hardware of the computing device 102 to model a surface 318 that is to be used as a basis to generate the predicted stroke. To do so, the surface modeling module 316 first defines a neighborhood "n(s)" around each sample "s" as the set of operation data samples 306 within a spatial and/or temporal neighborhood. The neighborhood may be set beforehand to have a user-specified size within a coordinate space of the 3D digital content 112, e.g., defined as a size within a user interface. The neighborhood "n(op)" of a stroke operation "op" is defined as a union of operations of neighborhood operation data samples 306 that belong to the following:

$$n(op) = \bigcup_{s' \in n(s), s' \in op', s \in op} op'$$

The surface modeling module 316 is configured to generate the surface 318 as defined by a cycle that is formed from a single stroke or a series of strokes, e.g., as input by a user 210 as stroke operation data 304 to create the 3D digital content 106. The surface modeling module 316 is also configured to determine cycles incrementally as operation data samples 306 are received in real time, which differs from conventional techniques that extract cycles based on a formation of a final 3D curve network.

In general, the surface modeling module 316 is configured to identify paths formed by strokes that intersect an input stroke, and measure a likelihood of each closed path that may be formed by the input stroke and the intersecting strokes of forming the surface 318. If a closed path is not found based on the existing strokes, the surface modeling module 316 is configured to construct strokes that may be used to form a closed path by "completing" existing strokes in the user interface. The surface is then generated by the surface modeling module 316 for the cycles that define valid closed paths, e.g., using bilinear interpolation.

In greater detail, the stroke operation data 304 is provided to a cycle generation module 320. The cycle generation module 320 is configured to generate candidate cycles 322 that define a closed path within the three-dimensional digital content based on the input stroke and at least one other stroke in the user interface (block 804) automatically and without user intervention. As part of this, the cycle generation module 320 may employ a variety of constraints, e.g., rules, to be used to define candidate cycles 322 that are valid for consideration to generate the surface 318.

In a first such example, a distance analysis module 324 is employed to define a neighborhood of strokes that exist within the 3D digital content 106 that are within a threshold distance of an input stroke, e.g., a stroke operation being input by a user. The threshold distance may be defined alone or a combination of x, y, or z directions. The cycle generation module 320 then identifies paths in the 3D digital content 106 that may be formed using the input stroke operation. As shown the example implementation 500 of FIG. 5A, for instance, an input stroke "$op_0$" 502 is input as part of 3D drawing content 106 that includes first, second, third, and fourth existing stroke operations "$op_1$" 504, "$op_2$" 506, "$op_3$" 508, "$op_4$" 510. The input stroke operation "$op_0$" 502 that is being drawn by a user is intersected by existing strokes "$op_1$" 504 and "$op_3$" 508 in 3D drawing content 106.

Each path "P={$op_i$}" (i=0, 1, 2, . . . )" starts from a current input stroke operation "$op_0$" 502 and an interactive search is performed for a next stroke operation within the neighborhood, e.g., "$op_{i+1} \in n(op_i)$." The 3D drawing content 106, for instance, includes first, second, third, fourth, fifth, and sixth samples "$s_1$" 512, "$s_2$" 514, "$s_3$" 516, "$s_4$" 518, "$s_5$" 520, "$s_6$" 522. The path covers each stroke operation "$op_i$" from sample "$s_i^{in}$" to "$s_i^{out}$" (e.g., from the third sample "$s_3$" 516 to the fourth sample "$s_4$" 518 for the dashed path in FIG. 5A) which may include samples defining ends of the input stroke operation "$op_0$" 502 or samples from intersections between neighboring stroke operations (e.g., fourth sample "$s_4$" 518). In particular, if input stroke operation "$op_0$" 502 forms a closed cycle (e.g., a circle), there are two paths from "$s_i^{in}$" to "$s_i^{out}$" (clockwise and counterclockwise).

The cycle generation module 320 then employs a direction analysis module 326 to ensure consistency of directionality (e.g., turn direction) of the input stroke operation and existing stroke operations, e.g., directions defined using surface normals at intersections of respective stroke operations. The cycle generation module 320, for instance, may determine whether directions at interactions of stroke operations used to form that path are consistent with each other, e.g., clockwise or counterclockwise turn directions at the intersections. In one example, for each interaction sample "$s_i^{out}$", the turn direction may be determined by the direction analysis module 326 via the following expression:

$$D(s_i^{out})=(p(s_{i+1}^{out})-p(s_{i+1}^{in}))\times(p(s_i^{out})-p(s_i^{in}))$$

where "p(s)" is the sample position as defined by the stroke operation definition expression and "$D(s_i^{out})$" is a normalized direction as shown in the example implementation 550 of FIG. 5B. As illustrated, turn directions "$D(s_2)$" 552, "$D(s_4)$" 554, "$D(s_6)$" 556 are defined as surface normals for corresponding interactions on the path. A closed path with consistent turns is considered valid for consideration as defining the surface by satisfying the directionality constraint that is enforced by the direction analysis module 326. For example, a closed path that includes "$D(s_2)$" 552 and "$D(s_6)$" 556 are consistent to each other whereas "$D(s_4)$" 554 is not. Since sample "$s_{i+1}^{in}$" is within the defined neighborhood to sample "$s_i^{out}$" (e.g., "$s_3 \in op_1$" and "$s_2 \in op_0$" in FIG. 5A), the directionality is defined as "$D(s_{i+1}^{in})=D(s_i^{out})$." Furthermore, a direction "D(P)" is defined as the averaged turn directions of path "P."

Returning again to FIG. 3, the cycle generation module 320 may also employ a length analysis module 328 that implements a constraint to define a minimum amount of the input stroke operation to be used as part of the generated cycle, such as to ensure that a sufficiently representative portion of the input stroke operation is used. The minimum amount may be defined in a number of ways, such as based on temporal parameters 312 such that a sufficient number of operation data samples 306 have been used, a defined minimum number of operation data samples 306 to be included based on an overall number of operation data samples 306 used to defined the input stroke (e.g., as currently input), a proportion, and so forth. A variety of other constraints may also be employed by the cycle generation module 320, such to ensure that an existing or constructed stroke operation used to define the cycle does not loop back to a starting point at which the existing or constructed stroke intersects the input stroke operation, i.e., does not form a self-intersecting loop with the input stroke operation.

Thus, the cycle generation module 320, as part of generating candidate cycles 322, employs constraints such that stroke operations are not repeated, turn direction is consistent and coherent between stroke operations (e.g., "$D(s_i^{out}) \cdot D(s_{i-1}^{out})>0.8$"), and a minimum amount of the input stroke operation is used (e.g., "|t ($s_i^{out}$)−($s_i^{in}$)|>0.2" where "t" is a temporal parameter 312, e.g., timestamp. In an implementation, if each of these constraints are not satisfied by a path, that path is not considered as a candidate cycle 322 by the cycle generation module 320.

In some instances, the cycle generation module 320 may not find a valid cycle that meets each of the above mentioned constraints. In such an instance, a cycle construction module 320 is employed to construct additional stroke operations automatically and without user intervention that may be used to define a candidate cycle 322.

In an example implementation 600 of FIG. 6A, the 3D digital content 106 input stoke operation "op0" 602 and first and second existing stroke operations "$op_1$," 604, "$op_2$," 606. The cycle construction module 320 first searches for a longest unclosed path that contains a current input stoke operation "$op_0$," 602. Since each of the paths "{$P_i$}" found in the previous section (e.g., first, second, and third paths "$P_1$" 608, "$P_2$," 610, "$P_3$," 608) starts with the input stoke operations "$op_0$," 602, candidate paths are obtained by cycle construction module 320 by merging each pair of paths from "{$P_i$}" head-to-head (e.g., the second path "$P_2$," 610) as long as the constraints of the cycle generation module 320 are met.

If the longest path contains at least three stroke operations, the cycle construction module 320 constructs a stroke operation to connect the two unconnected ends to form a cycle. An example of this is illustrated in the example implementation of FIG. 6B by adding a constructed stroke operation "$op_3$," 652 at the exposed ends of the first and second existing stroke operations "$op_1$," 604, "$op_2$," 606. For example, path "$P_1$," 608 that includes stroke operations "$op_0$," 602, "$op_1$," 604 are the input stroke operation and existing stroke operation and path "$P_2$," 610 includes stroke operations "$op_0$," 602, "$op_2$," 606 as the input stroke operation and existing stroke operation. Paths "$P_1$," 608 and "$P_2$," 610 are then merged by the cycle construction module 320 to form path "$P_3$," 612 if turn direction is consistent. The merged path "$P_3$," 612 is then closed by constructing stroke operation "$op_3$," 652 as shown as a transformation of a stroke operation disposed at an opposing side of the cycle, e.g., input stroke operation "$op_0$," 602 in this example.

The cycle construction module 320 may even construct more than one stroke operation. For example, the 3D digital content 106 may include an input stroke operation and a single existing stroke operation. In response, the cycle construction module 320 constructs two stroke operations (e.g., stroke operations "$op_2$," 606, "$op_3$," 652) to form a four-sided cycle. In such an instance, the construction of stroke operations is validated against constraints enforced by other modules of the cycle generation module 320 as described above. In this way, the cycle generation module 320 may generate candidate cycles 322 usable to define a surface as the input stroke operation is received, which is not possible using conventional techniques that rely on a completed cycle.

The candidate cycles 322 are then output to a cycle selection module 332 to select a cycle 334 from the candidate cycles 322 that is to be used as a basis to generate the surface 318. To do so, the cycle selection module 322 removes candidate cycles 322 that overlap. This may be performed by analyzing candidate cycles 322, from smaller to larger, and removing those that overlap existing cycles.

For each stoke operation "op ∈ P", for instance, the cycle selection module 332 defines at each sample "s ∈ op" a surface direction "d(s)" as an estimate of a local surface normal. For example, samples "$s_1$" 702, "$s_2$" 704, "$s_3$" 706 of FIG. 7A have defined surface directions "$d(s_1)$" 708, "$d(s_2)$" 710, "$d(s_1)$" 712. If each cycle "P" covers an input stroke operation "$op_0$" 602 from samples "$s^{in}$" to "$s^{out}$" two cycles "$P_i$" and "$P_j$" are considered overlapped if:

(1) region "[$s_i^{in}$, $s_i^{out}$] ∈ $P_i$" overlaps with "[$s_j^{in}$, $s_j^{out}$] ∈ $P_j$";
(2) corresponding surface directions within the overlapped region are within a threshold (e.g., "$d_{pi}(s) \cdot d_{pj}(s) > 0.8$"); and
(3) averaged turn directions are within a threshold (e.g., "$D(P_i) \cdot D(P_j) > 0.8$").

An example of this is illustrated in the example implementations 700, 750 of FIGS. 7A and 7B. Samples "$s_1$" 702, "$s_2$" 704, "$s_3$" 706 have defined surface directions "$d(s_1)$" 708, "$d(s_2)$" 710, "$d(s_1)$" 712 as previously described. In particular, the surface direction of the intersecting sample (e.g., "$d(s_1)$" 708) is the local normal direction, and an interior surface direction (e.g., "$d(s_2)$" 710) is calculated via linear interpolation. If two candidate cycles (e.g., $P_{1,2}$ 752, 754) have overlapped regions (e.g., "[$s_1$ 702, $s_2$ 706] ∈ $op_0$"), corresponding surface directions at the overlapped region indicate a relative amount of closeness of the cycle surfaces as arranged in three-dimensional space. The cycle selection module 322 is configured to generate the selected cycles 334 from the candidate cycles 322 by progressing from smaller to larger. Cycles (e.g., $P_1$ 752) with overlapped regions and close surface directions to existing cycles (e.g., $P_{2,3}$ 754, 756) are not selected from the candidate cycles 322 for inclusion as a selected cycle 334.

A surface construction module 336 is then employed by the surface modeling module 316 to construct the surface 318 based on the selected cycle 334, i.e., the cycle generated by the cycle generation module 320 and cycle selection module 322 in this example (block 806). The surface construction module 336, for instance, may split a path defined by the selected cycle 334 into four pieces in a manner that generally preserves sample directions within each piece, i.e., surface directions of samples within the piece are generally consistent with each other. This may be performed by initialize four splitting positions "$\{a_i\}$" evenly along a path and then dynamically adjusting the position to the side of the path that has closer respective directions, respectively. This may be performed by increased "$a_i$" if a corresponding surface direction is closer to an average direction of piece "[$a_i$, $a_{i+1}$]" than piece "[$a_{i-1}$, $a_i$]."

Mesh vertices are then computed by the surface construction module 336 using bilinear interpolation as follows:

$$p(r_x, r_y) = p(s_{a_0}) * (1 - r_s) * (1 - r_y) + \\ p(s_{a_1}) * r_x * (1 - r_y) + p(s_{a_2}) * r_x * r_y + p(s_{a_3}) * (1 - r_x) * r_y$$

where "$r_x$" and "$r_y$" are two scalar ratios between "0" to "1." To maintain coherent density of the mesh vertices, the surface construction module 336 may be configured to evenly sample "$W(S) = \max(|a_1 - a_0|, |a_3 - a_2|)$" and "$H(S) = \max(|a_2 - a_1|, |a_0 + N - a_3|)$" values for "$r_x$" and "$r_y$", respectively. Thus, the surface 318 "S" is formed of "W(S)*H(S)" patches "$\{S_{ij}\}$", I-0, 1, . . . , W(S)-1" and "j=0, 1, . . . , H(S)-1."

A predicted stroke operation is then generated based at least in part on the constructed surface 318 (block 808) and output in real time in the user interface as part of the three-dimensional digital content as the stroke operation data is received (block 810). As operation data samples 306 are received for an input stroke operation, for instance, the surface modeling module may generate cycles and from these cycles a surface to generate the predicted stroke operation. A variety of techniques may be used to generate the prediction based on the surface 318, an example of which is included in the following section and shown using corresponding figures.

Surface-Based Stroke Prediction

Figure 9:
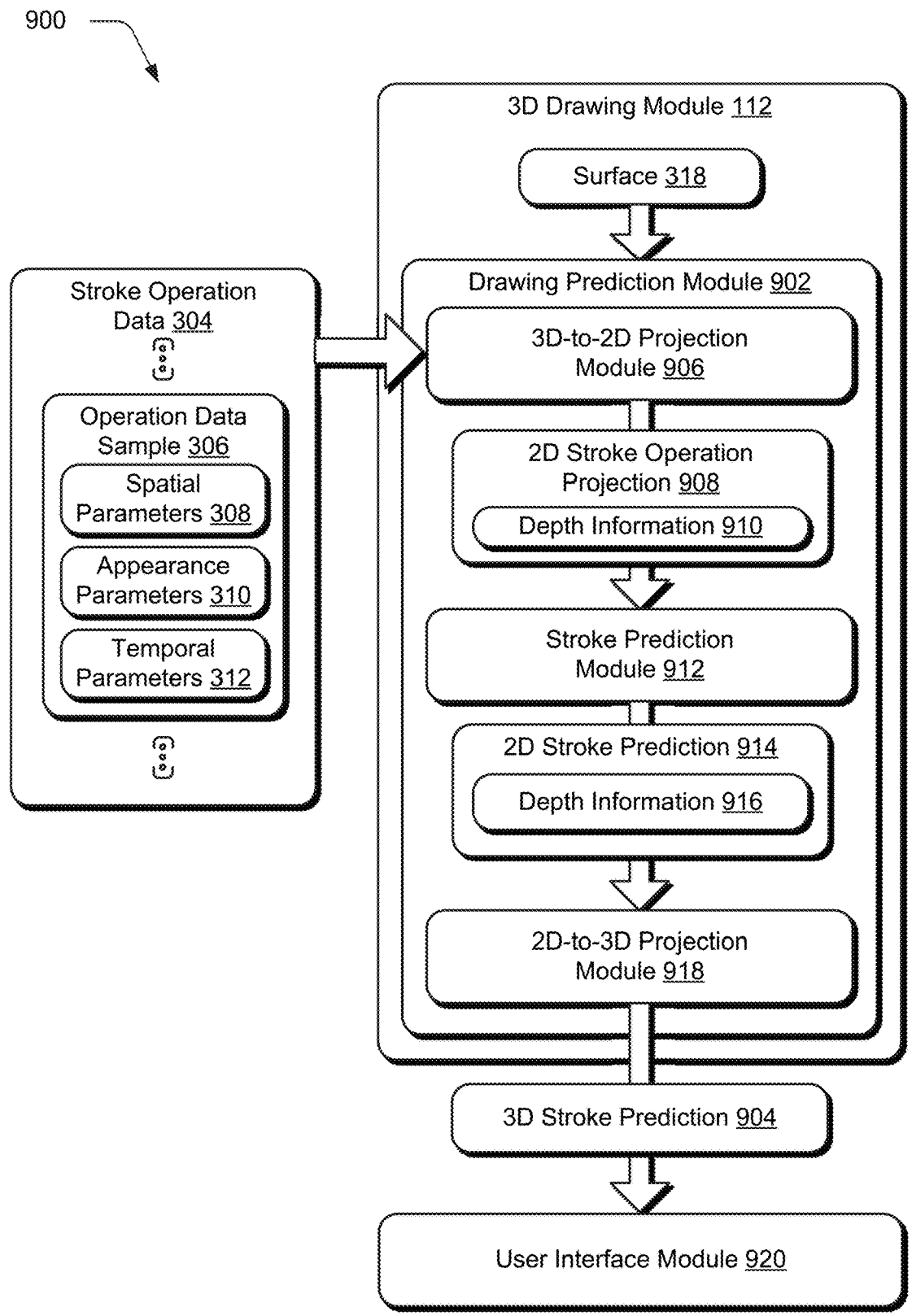
FIG. 9 depicts a system in an example implementation in which a surface as generated in FIG. 3 is used to generate a stroke operation prediction for output in a user interface.
Figure 10:
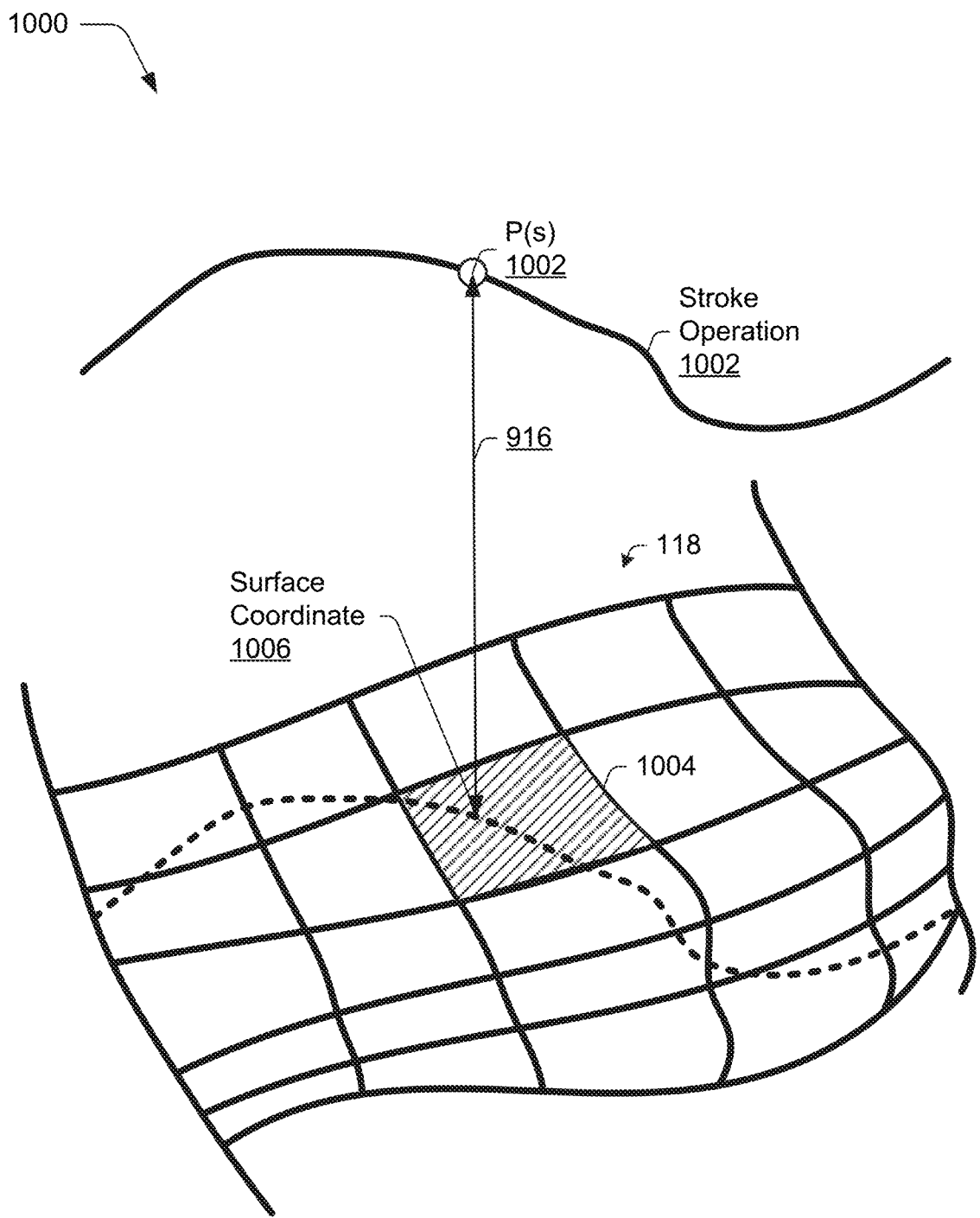
FIG. 10 depicts an example implementation of projection from a 3D generated surface into two dimensions with depth information.
Figure 11:
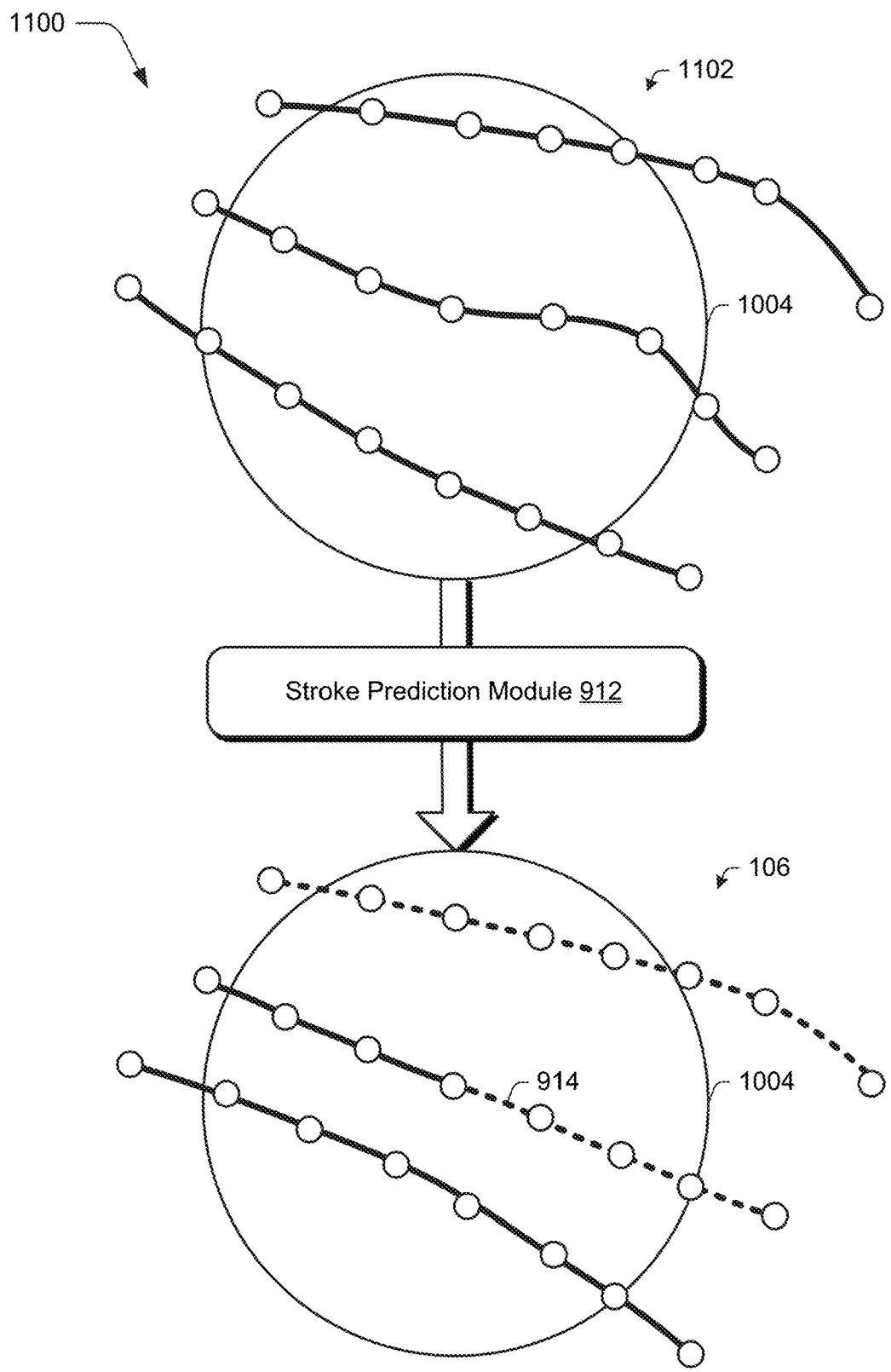
FIG. 11 depicts an example implementation of output of predicted stroke operations as generated by the system in real time.

FIG. 9 depicts a system 900 in an example implementation in which the surface 318 as generated in FIG. 3 is used to generate a predicted stroke operation for output in a user interface. FIG. 10 depicts an example implementation 1000 of projection from a 3D generated surface 318 into two dimensions with depth information. FIG. 11 depicts an example implementation of output of predicted stroke operation as generated by the system 900 in real time.

The 3D drawing module 112 in this example includes a drawing prediction module 902 that is configured to generate a three-dimensional stroke operation prediction 904 based on the stroke operation data 304 and the surface 318 from FIG. 3. In this example, instead of processing each 3D stroke operation in three dimensions directly in order to generate the 3D stroke prediction 904, the drawing prediction module 902 is configured to project each stroke operation "op" onto the surface 318 in to form a two dimensional stroke operation projection. This projection is then used as a basis to predict the stroke operation, which is then back-projected into three dimensions as the 3D stroke prediction 904.

For example, the drawing prediction module 902 may first employ a 3D-to-2D projection module 906 to project, for each operation data sample 306 for a stroke operation in the stroke operation data 304 (e.g., "s ∈ op") a surface coordinate on the surface "S" 318 using an interactive technique. Specifically, the 3D-to-2D projection module 906 starts from an initial patch "$S_{ij}$" (e.g., a middle patch of "S") and arranges a ray from "p(s)" of the respective sample towards a plane of the initial patch "$S_{ij}$" perpendicularly. If the intersection point is located within the initial patch "$S_{ij}$", then that patch is considered the closest patch. Otherwise, the next patch may be found according to an intersection point and this process is iterated until the target patch or a set number of iterations is reached by the 3D-to-2D projection module 906.

After a target patch "$S_{ij}$" is identified, a surface coordinate of sample "s" is calculated according to its intersection point as shown in the example implementation 1000 of FIG. 10. A stroke operation 1002 is shown in relation to the generated surface 118 and patch 1004 of the surface. Each sample "s ∈ op" is projected to the nearest patch (e.g., patch 1004) on the surface "S" 118 and represented as a surface coordinate 1006 based on the intersection point and corresponding depth information 1008.

The 2D stroke operation projection 908 and depth information 910 are then provided to a stroke prediction module 912. An example of operation of the stroke prediction module 912 is shown in the example implementation 1100 of FIG. 11. The stroke prediction module 912 receives past stroke operations 1102 as input, which may originate internal to the 3D digital content 106 or another item of digital content. The solid lines illustrated for the 3D digital content 106 indicate recently input samples of corresponding stroke operations, and are used by the stroke prediction module 112 to find similarly drawn strokes (e.g., similar shapes and contours).

This similarity is then used to generate a two dimensional stroke prediction 914 of what a user might input next. The circles indicate corresponding neighborhoods that are used as a basis for the prediction between the past stroke operations 1102 and the 3D digital content 106. Further examples of prediction techniques may be found at "Autocomplete Painting Repetitions" to Jun Xing, Hsiang-Ting Chen, and Li-Yi Wei, ACM Trans. Graph. 34, 6(October), 169:1-169:11, which is incorporated by reference in its entirety.

The 2D stroke prediction 914 and depth information 916 are then used by a 2D-to-3D projection module 918 to generate the 3D stroke prediction 904 by back projecting the 2D stroke prediction 214 using the depth information 916. The 3D stroke prediction 904 is then provided to a user interface module 920 for rendering as part of a user interface.

The user interface module 920, for instance, may output a single predicted stroke, the display of which is configured to "fade over time" if not selected by a user. In another example, the 3D stroke prediction 904 may be included as part of a prediction to "fill in" an entirety of the surface 318, e.g., as a mesh to repeat an observed pattern. A variety of other examples are also contemplated without departing from the spirit and scope of the above discussion.

Example System and Device

Figure 12:
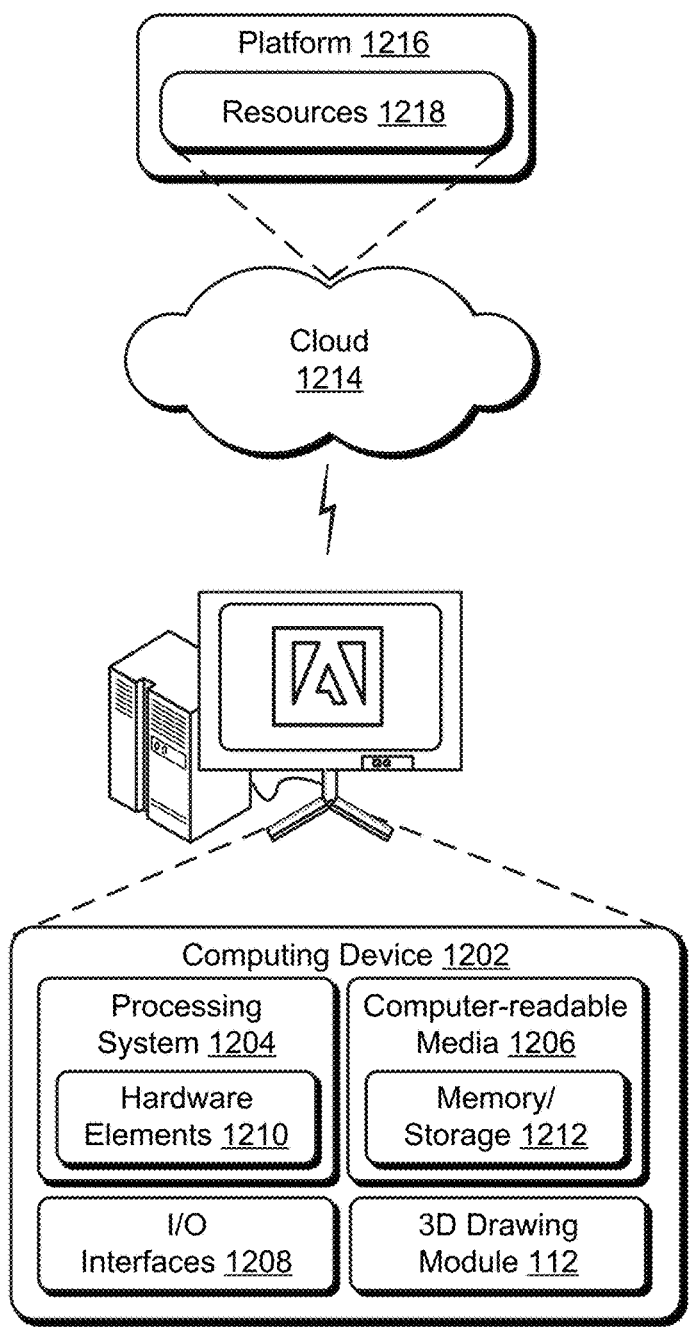
FIG. 12 illustrates an example system including various components of an example device that can be implemented as any type of computing device as described and/or utilize with reference to FIGS. 1-11 to implement embodiments of the techniques described herein.

FIG. 12 illustrates an example system generally at 1200 that includes an example computing device 1202 that is representative of one or more computing systems and/or devices that may implement the various techniques described herein. This is illustrated through inclusion of the 3D drawing module 112. The computing device 1202 may be, for example, a server of a service provider, a device associated with a client (e.g., a client device), an on-chip system, and/or any other suitable computing device or computing system.

The example computing device 1202 as illustrated includes a processing system 1204, one or more computer-readable media 1206, and one or more I/O interface 1208 that are communicatively coupled, one to another. Although not shown, the computing device 1202 may further include a system bus or other data and command transfer system that couples the various components, one to another. A system bus can include any one or combination of different bus structures, such as a memory bus or memory controller, a peripheral bus, a universal serial bus, and/or a processor or local bus that utilizes any of a variety of bus architectures. A variety of other examples are also contemplated, such as control and data lines.

The processing system 1204 is representative of functionality to perform one or more operations using hardware. Accordingly, the processing system 1204 is illustrated as including hardware element 1210 that may be configured as processors, functional blocks, and so forth. This may include implementation in hardware as an application specific integrated circuit or other logic device formed using one or more semiconductors. The hardware elements 1210 are not limited by the materials from which they are formed or the processing mechanisms employed therein. For example, processors may be comprised of semiconductor(s) and/or transistors (e.g., electronic integrated circuits (ICs)). In such a context, processor-executable instructions may be electronically-executable instructions.

The computer-readable storage media 1206 is illustrated as including memory/storage 1212. The memory/storage 1212 represents memory/storage capacity associated with one or more computer-readable media. The memory/storage component 1212 may include volatile media (such as random access memory (RAM)) and/or nonvolatile media (such as read only memory (ROM), Flash memory, optical disks, magnetic disks, and so forth). The memory/storage component 1212 may include fixed media (e.g., RAM, ROM, a fixed hard drive, and so on) as well as removable media (e.g., Flash memory, a removable hard drive, an optical disc, and so forth). The computer-readable media 1206 may be configured in a variety of other ways as further described below.

Input/output interface(s) 1208 are representative of functionality to allow a user to enter commands and information to computing device 1202, and also allow information to be presented to the user and/or other components or devices using various input/output devices. Examples of input devices include a keyboard, a cursor control device (e.g., a mouse), a microphone, a scanner, touch functionality (e.g., capacitive or other sensors that are configured to detect physical touch), a camera (e.g., which may employ visible or non-visible wavelengths such as infrared frequencies to recognize movement as gestures that do not involve touch), and so forth. Examples of output devices include a display device (e.g., a monitor or projector), speakers, a printer, a network card, tactile-response device, and so forth. Thus, the computing device 1202 may be configured in a variety of ways as further described below to support user interaction.

Various techniques may be described herein in the general context of software, hardware elements, or program modules. Generally, such modules include routines, programs, objects, elements, components, data structures, and so forth that perform particular tasks or implement particular abstract data types. The terms "module," "functionality," and "component" as used herein generally represent software, firmware, hardware, or a combination thereof. The features of the techniques described herein are platform-independent, meaning that the techniques may be implemented on a variety of commercial computing platforms having a variety of processors.

An implementation of the described modules and techniques may be stored on or transmitted across some form of computer-readable media. The computer-readable media may include a variety of media that may be accessed by the computing device 1202. By way of example, and not limitation, computer-readable media may include "computer-readable storage media" and "computer-readable signal media."

"Computer-readable storage media" may refer to media and/or devices that enable persistent and/or non-transitory storage of information in contrast to mere signal transmission, carrier waves, or signals per se. Thus, computer-readable storage media refers to non-signal bearing media. The computer-readable storage media includes hardware such as volatile and non-volatile, removable and non-removable media and/or storage devices implemented in a method or technology suitable for storage of information such as computer readable instructions, data structures, program modules, logic elements/circuits, or other data. Examples of computer-readable storage media may include, but are not limited to, RAM, ROM, EEPROM, flash memory or other memory technology, CD-ROM, digital versatile disks (DVD) or other optical storage, hard disks, magnetic cassettes, magnetic tape, magnetic disk storage or other magnetic storage devices, or other storage device, tangible media, or article of manufacture suitable to store the desired information and which may be accessed by a computer.

"Computer-readable signal media" may refer to a signal-bearing medium that is configured to transmit instructions to the hardware of the computing device 1202, such as via a network. Signal media typically may embody computer readable instructions, data structures, program modules, or other data in a modulated data signal, such as carrier waves, data signals, or other transport mechanism. Signal media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared, and other wireless media.

As previously described, hardware elements 1210 and computer-readable media 1206 are representative of modules, programmable device logic and/or fixed device logic implemented in a hardware form that may be employed in some embodiments to implement at least some aspects of the techniques described herein, such as to perform one or more instructions. Hardware may include components of an integrated circuit or on-chip system, an application-specific integrated circuit (ASIC), a field-programmable gate array (FPGA), a complex programmable logic device (CPLD), and other implementations in silicon or other hardware. In this context, hardware may operate as a processing device that performs program tasks defined by instructions and/or logic embodied by the hardware as well as a hardware utilized to store instructions for execution, e.g., the computer-readable storage media described previously.

Combinations of the foregoing may also be employed to implement various techniques described herein. Accordingly, software, hardware, or executable modules may be implemented as one or more instructions and/or logic embodied on some form of computer-readable storage media and/or by one or more hardware elements 1210. The computing device 1202 may be configured to implement particular instructions and/or functions corresponding to the software and/or hardware modules. Accordingly, implementation of a module that is executable by the computing device 1202 as software may be achieved at least partially in hardware, e.g., through use of computer-readable storage media and/or hardware elements 1210 of the processing system 1204. The instructions and/or functions may be executable/operable by one or more articles of manufacture (for example, one or more computing devices 1202 and/or processing systems 1204) to implement techniques, modules, and examples described herein.

The techniques described herein may be supported by various configurations of the computing device 1202 and are not limited to the specific examples of the techniques described herein. This functionality may also be implemented all or in part through use of a distributed system, such as over a "cloud" 1214 via a platform 1216 as described below.

The cloud 1214 includes and/or is representative of a platform 1216 for resources 1218. The platform 1216 abstracts underlying functionality of hardware (e.g., servers) and software resources of the cloud 1214. The resources 1218 may include applications and/or data that can be utilized while computer processing is executed on servers that are remote from the computing device 1202. Resources 1218 can also include services provided over the Internet and/or through a subscriber network, such as a cellular or Wi-Fi network.

The platform 1216 may abstract resources and functions to connect the computing device 1202 with other computing devices. The platform 1216 may also serve to abstract scaling of resources to provide a corresponding level of scale to encountered demand for the resources 1218 that are implemented via the platform 1216. Accordingly, in an interconnected device embodiment, implementation of functionality described herein may be distributed throughout the system 1200. For example, the functionality may be implemented in part on the computing device 1202 as well as via the platform 1216 that abstracts the functionality of the cloud 1214.

CONCLUSION

Although the invention has been described in language specific to structural features and/or methodological acts, it is to be understood that the invention defined in the appended claims is not necessarily limited to the specific features or acts described. Rather, the specific features and acts are disclosed as example forms of implementing the claimed invention.

What is claimed is:

1. In a digital medium environment to generate three-dimensional digital content, a method implemented by at least one computing device configured to be worn by a user, the method comprising:
   receiving, by the at least one computing device, stroke operation data describing an input stroke operation received via a user interface with respect to the three-dimensional digital content, the input stroke operation detected by a sensor of the at least one computing device as a hand gesture of the user, and the three-dimensional digital content defining at least a portion of an augmented or virtual reality environment;
   generating, by the at least one computing device, a cycle that defines a closed path within the three-dimensional digital content based on the input stroke operation and at least one other stroke operation in the user interface;
   constructing, by the at least one computing device, a surface based on the generated cycle;
   generating, by the at least one computing device, a predicted stroke operation based at least in part on the constructed surface; and
   outputting, by an output device associated with the at least one computing device, the predicted stroke operation in real time in the user interface as part of the three-dimensional digital content as the stroke operation data is received, the predicted stroke operation being user selectable within a set amount of time to cause the predicted stroke operation to be included as part of the three-dimensional digital content.

2. The method as described in claim 1, wherein:
   the stroke operation data includes a plurality of operation data samples; and
   the generating of the cycle and the constructing of the surface are performed in real time as the plurality of operation data samples are received.

3. The method as described in claim 2, wherein each of the plurality of operation data samples includes a spatial parameter, an appearance parameter, and a temporal parameter.

4. The method as described in claim 1, wherein the generating of the cycle is based on the input stroke operation and at least one constraint used to select the at least one other stroke operation in the user interface from a plurality of other stroke operations in the user interface.

5. The method as described in claim 1, wherein the generating of the cycle is based on the input stroke operation and at least one constraint used to identify the at least one other stroke operation in the user interface, the at least one constraint defining a threshold spatial or temporal distance between the input stroke operation and the at least one other stroke operation within the three-dimensional digital content.

6. The method as described in claim 1, wherein the generating of the cycle is based on the input stroke operation and at least one constraint used to identify the at least one other stroke operation in the user interface, the at least one constraint defining a direction between the input stroke operation and the at least one other stroke operation within the three-dimensional digital content.

7. The method as described in claim 6, wherein the direction is defined through a relationship of a surface normal of the input stroke operation and a surface normal of the at least one other stroke operation.

8. The method as described in claim 1, wherein the generating of the cycle is based on the input stroke operation and at least one constraint used to identify the at least one other stroke operation in the user interface, the at least one constraint defining a minimum amount of the input stroke operation to be used as part of the generated cycle as defined between the input stroke operation and the at least one other stroke operation within the three-dimensional digital content.

9. The method as described in claim 1, wherein the generating of the cycle is based on the input stroke operation and at least one constraint used to identify the at least one other stroke operation in the user interface, the at least one constraint specifying that the at least one other stroke operation does not loop back to a starting point at which the at least one other stroke operation intersects the input stroke operation.

10. The method as described in claim 1, wherein the generating of the cycle includes constructing the at least one other stroke operation automatically and without user intervention to form the cycle, the at least one other stroke operation not included in the user interface before the constructing of the at least one other stroke operation.

11. The method as described in claim 1, wherein the generating of the cycle includes generating a plurality of candidate cycles based on the input stroke operation and selecting the cycle from the plurality of candidate cycles.

12. The method as described in claim 1, wherein the constructing of the surface includes generating mesh vertices of the surface based on the generated cycle using bilinear interpolation.

13. The method as described in claim 1, wherein the generating of the predicted stroke operation includes:
projecting the stroke operation data into a two-dimensional stroke operation projection based on the constructed surface and depth information defining a distance of the two-dimensional stroke operation projection to the constructed surface;
calculating a two-dimensional stroke operation prediction based on the two-dimensional stroke operation projection; and
projecting the two-dimensional stroke operation projection into three dimensions to generate the predicted stroke operation based on the distance to the constructed surface.

14. The method as described in claim 1, wherein the generating of the predicted stroke operation is based on high-level structure exhibited by existing stroke operations in the user interface.

15. In a digital medium environment to generate three-dimensional digital content, a system comprising:
a cycle generation module implemented at least partially in hardware of a computing device configured to be worn by a user to generate a cycle that defines a closed path within the three-dimensional digital content based on an input stroke operation, at least one other stroke operation in a user interface, and at least one constraint, the input stroke operation detected by a sensor of the computing device as a gesture of the user that defines a line in three dimensions in the user interface, and the three-dimensional digital content defining at least a portion of an augmented or virtual reality environment;
a surface construction module implemented at least partially in the hardware of the computing device to construct a surface based on the generated cycle; and
a stroke prediction module implemented at least partially in the hardware of the computing device to generate a predicted stroke operation based at least in part on the constructed surface, the predicted stroke operation being user selectable to cause the predicted stroke operation to be included as part of the three-dimensional digital content.

16. The system as described in claim 15, wherein the at least one constraint defines:
a threshold temporal or spatial distance between the input stroke operation and the at least one other stroke operation within the three-dimensional digital content;
a direction between the input stroke operation and the at least one other stroke operation within the three-dimensional digital content; or
a minimum amount of the input stroke operation to be used as part of the generated cycle as defined between the input stroke operation and the at least one other stroke operation within the three-dimensional digital content.

17. In a digital medium environment to generate three-dimensional digital content, a system comprising:
means for generating a cycle that defines a closed path within the three-dimensional digital content based on at least one constraint, an input stroke operation, and at least one other stroke operation in a user interface used to generate the three-dimensional digital content, the input stroke operation detected by a sensor of a computing device, and the three-dimensional digital content defining at least a portion of an augmented or virtual reality environment;
means for constructing a surface based on the generated cycle; and
means for displaying a predicted stroke operation in the user interface based at least in part on the constructed surface, for a set amount of time and if the predicted stroke operation is not selected within the set amount of time, then the predicted stroke operation is automatically removed from the user interface.

18. The system as described in claim 17, wherein the at least one constraint defines:

a threshold temporal or spatial distance between the input stroke operation and the at least one other stroke operation within the three-dimensional digital content;

a direction between the input stroke operation and the at least one other stroke operation within the three-dimensional digital content; or a minimum amount of the input stroke operation to be used as part of the generated cycle as defined between the input stroke operation and the at least one other stroke operation within the three-dimensional digital content.

19. The system as described in claim 17, wherein the input stroke operation is detected by the sensor of the computing device as a gesture of a user that defines a line in three dimensions in the user interface.

20. The system as described in claim 17, further comprising means for generating mesh vertices of the surface based on the generated cycle using bilinear interpolation.

\* \* \* \* \*